United States Patent
Pawlak et al.

(10) Patent No.: US 11,111,360 B2
(45) Date of Patent: Sep. 7, 2021

(54) RUBBER COMPOSITION COMPRISING AT LEAST ONE SILICA AS INORGANIC REINFORCING FILLER

(71) Applicant: COMPAGNIE GENERALE DES ETABLISSEMENTS MICHELIN, Clermont-Ferrand (FR)

(72) Inventors: Angélique Pawlak, Clermont-Ferrand (FR); Emmanuelle Allain Najman, L'Hay les Roses (FR); Stéphane Badaire, Clermont-Ferrand (FR); Caroline Fayolle, Lyons (FR); Pascaline Garbey, Saint Didier au Mont d'Or (FR); Laurent Guy, Rillieux-la-Pape (FR); Sylvaine Neveu, Paris (FR); Fabien Stocklouser, Lyons (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/610,685

(22) PCT Filed: May 3, 2018

(86) PCT No.: PCT/FR2018/051099
§ 371 (c)(1),
(2) Date: Nov. 4, 2019

(87) PCT Pub. No.: WO2018/203002
PCT Pub. Date: Nov. 8, 2018

(65) Prior Publication Data
US 2020/0165419 A1 May 28, 2020

(30) Foreign Application Priority Data
May 5, 2017 (FR) ....................... 1753968

(51) Int. Cl.
*C08L 9/06* (2006.01)
*B60C 1/00* (2006.01)
(Continued)

(52) U.S. Cl.
CPC .............. *C08L 9/06* (2013.01); *B60C 1/00* (2013.01); *B60C 1/0016* (2013.01); *C08K 3/04* (2013.01);
(Continued)

(58) Field of Classification Search
CPC ... C08K 5/09; C08K 3/04; C08K 3/06; C08K 3/22; C08K 3/36; C08K 5/548;
(Continued)

(56) References Cited

U.S. PATENT DOCUMENTS 3,842,111 A 10/1974 Meyer-Simon et al.
3,873,489 A 3/1975 Thurn et al.
(Continued)

FOREIGN PATENT DOCUMENTS

EP 0501227 A1 9/1992
EP 0520862 A1 12/1992
(Continued)

OTHER PUBLICATIONS

International Search Report dated Jul. 3, 2018, in corresponding PCT/FR2018/051099 (4 pages).
S. Brunauer, et al.,"Adsorption of Gases in Multimolecular Layers", J. Am. Chem. Soc., vol. 60, pp. 309-319 (1938).
F. Vilmin, et al., "Fast and Robust Method for the Determination of Microstructure and Composition in Butadiene, Styrene-Butadiene, and Isoprene Rubber by Near-Infrared Spectroscopy", Appl. Spectroscopy, vol. 60, No. 6, pp. 619-630 (2006).
J.S. Taurozzi, et al., "Preparation of Nanoparticle Dispersions from Powdered Material Using Ultrasonic Disruption", version 1.1, National Institute of Standards and Technology, NIST Special Publication 1200-2, pp. 1-15 (2012).

* cited by examiner

Primary Examiner — Angela C Scott
(74) Attorney, Agent, or Firm — Venable LLP

(57) ABSTRACT

A rubber composition is based on at least one elastomer, a reinforcing inorganic filler, an agent for coupling the elastomer to the reinforcing inorganic filler, and a crosslinking system. The reinforcing inorganic filler comprises at least one silica S having: a CTAB specific surface area $S_{CTAB}$ within a range extending from 40 to 300 m²/g; a difference between the BET specific surface area $S_{BET}$ and the CTAB specific surface area $S_{CTAB}$ of greater than or equal to 35 m²/g; an aluminium content $W_{Al}$ within a range extending from 0.5 to 7.0% by weight relative to the weight of the silica S; a width of the aggregate size distribution Ld, measured by centrifugal sedimentation, of greater than or equal to 1.5; and a median aggregate diameter d50, measured by centrifugal sedimentation, such that for a given value of CTAB specific surface area $S_{CTAB}$ and a given aluminium content $W_{Al}$, a magnitude A is defined by the following equation (I): A=[d50]+0.782×[$S_{CTAB}$]−8.524×[$W_{Al}$] (I), in which: [d50] is the numerical value of d50, expressed in nm; [$S_{CTAB}$] is the numerical value of $S_{CTAB}$, expressed in m²/g; [$W_{Al}$] is the numerical value of $W_{Al}$, expressed in % by weight relative to the weight of the silica S; and said magnitude A satisfies the relationship (II): A≥253 (II). The compositions of the invention are of use in tyres or semi-finished articles for tyres.

19 Claims, No Drawings

(51) Int. Cl.

| | |
|---|---|
| *C08K 3/04* | (2006.01) |
| *C08K 3/06* | (2006.01) |
| *C08K 3/22* | (2006.01) |
| *C08K 3/36* | (2006.01) |
| *C08K 5/09* | (2006.01) |
| *C08L 7/00* | (2006.01) |
| *C08K 5/548* | (2006.01) |
| *C08K 5/18* | (2006.01) |
| *C08L 15/00* | (2006.01) |
| *C08L 57/02* | (2006.01) |
| *C08K 5/47* | (2006.01) |
| *C08K 5/31* | (2006.01) |

(52) U.S. Cl.
 CPC ............... *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/548* (2013.01); *C08L 7/00* (2013.01); *C08L 15/00* (2013.01); *C08L 57/02* (2013.01); *C08K 2003/2296* (2013.01); *C08K 2201/003* (2013.01); *C08K 2201/006* (2013.01); *C08K 2201/016* (2013.01); *C08L 2205/02* (2013.01); *C08L 2312/00* (2013.01)

(58) Field of Classification Search
 CPC ... C08K 5/31; C08K 5/18; C08K 5/47; C08K 2201/016; C08K 2003/2296; C08K 2201/006; C08K 2201/003; C01B 33/12; C08L 15/00; C08L 7/00; C08L 9/06; C08L 57/02; C08L 2205/02; C08L 2312/00; B60C 1/0016; B60C 1/00
 See application file for complete search history.

(56) References Cited

U.S. PATENT DOCUMENTS

| | | | |
|---|---|---|---|
| 3,978,103 | A | 8/1976 | Meyer-Simon et al. |
| 3,997,581 | A | 12/1976 | Pletka et al. |
| 4,002,594 | A | 1/1977 | Fetterman |
| 4,072,701 | A | 2/1978 | Pletka et al. |
| 4,129,585 | A | 12/1978 | Buder et al. |
| 5,227,425 | A | 7/1993 | Rauline |
| 5,403,570 | A | 4/1995 | Chevallier et al. |
| 5,547,502 | A | 8/1996 | Chevallier et al. |
| 5,580,919 | A | 12/1996 | Agostini et al. |
| 5,583,245 | A | 12/1996 | Parker et al. |
| 5,587,416 | A | 12/1996 | Chevallier et al. |
| 5,650,457 | A | 7/1997 | Scholl et al. |
| 5,663,358 | A | 9/1997 | Cohen et al. |
| 5,663,395 | A | 9/1997 | Gobel et al. |
| 5,663,396 | A | 9/1997 | Musleve et al. |
| 5,665,812 | A | 9/1997 | Gorce et al. |
| 5,674,932 | A | 10/1997 | Agostini et al. |
| 5,675,014 | A | 10/1997 | Cohen et al. |
| 5,684,171 | A | 11/1997 | Wideman et al. |
| 5,684,172 | A | 11/1997 | Wideman et al. |
| 5,696,197 | A | 12/1997 | Smith et al. |
| 5,708,053 | A | 1/1998 | Jalics et al. |
| 5,811,479 | A | 9/1998 | Labauze |
| 5,821,290 | A | 10/1998 | Labauze |
| 5,852,099 | A | 12/1998 | Vanel |
| 5,892,085 | A | 4/1999 | Munzenberg et al. |
| 5,900,449 | A | 5/1999 | Custodero et al. |
| 5,925,713 | A | 7/1999 | Labauze |
| 5,977,238 | A | 11/1999 | Labauze |
| 6,013,718 | A | 1/2000 | Cabioch et al. |
| 6,140,393 | A | 10/2000 | Bomal et al. |
| 6,191,205 | B1 | 2/2001 | Micouin et al. |
| 6,204,322 | B1 | 3/2001 | Labauze |
| 6,313,205 | B1 | 11/2001 | Chiron et al. |
| 6,344,506 | B2 | 2/2002 | Vasseur |
| 6,362,253 | B1 | 3/2002 | Durel |
| 6,420,488 | B1 | 7/2002 | Penot |
| 6,465,544 | B1 | 10/2002 | Bomal et al. |
| 6,503,973 | B2 | 1/2003 | Robert et al. |
| 6,536,492 | B2 | 3/2003 | Vasseur |
| 6,610,261 | B1 | 8/2003 | Custodero et al. |
| 6,747,087 | B2 | 6/2004 | Custodero et al. |
| 6,765,045 | B1 | 7/2004 | Daniel et al. |
| 6,774,255 | B1 | 8/2004 | Tardivat et al. |
| 6,815,473 | B2 | 11/2004 | Robert et al. |
| 6,849,754 | B2 | 2/2005 | Deschler et al. |
| 6,975,396 | B2 | 12/2005 | Custodero et al. |
| 7,135,517 | B2 | 11/2006 | Simonot et al. |
| 7,199,175 | B2 | 4/2007 | Vasseur |
| 7,202,295 | B2 | 4/2007 | Simonot et al. |
| 7,217,751 | B2 | 5/2007 | Durel et al. |
| 7,250,463 | B2 | 7/2007 | Durel et al. |
| 7,256,233 | B2 | 8/2007 | Simonot et al. |
| 7,300,970 | B2 | 11/2007 | Durel et al. |
| 7,425,313 | B2 | 9/2008 | Custodero et al. |
| 7,488,768 | B2 | 2/2009 | Tardivat et al. |
| 7,491,767 | B2 | 2/2009 | Durel et al. |
| 7,504,456 | B2 | 3/2009 | Chaves et al. |
| 7,550,524 | B2 | 6/2009 | Chaves et al. |
| 7,820,771 | B2 | 10/2010 | Lapra et al. |
| 7,900,667 | B2 | 3/2011 | Vasseur |
| 8,017,098 | B2 * | 9/2011 | Uhrlandt ............... C01B 33/193 423/335 |
| 8,324,310 | B2 | 12/2012 | Robert et al. |
| 8,344,063 | B2 | 1/2013 | Marechal et al. |
| 8,455,584 | B2 | 6/2013 | Robert et al. |
| 8,461,269 | B2 | 6/2013 | Varagniat et al. |
| 8,492,475 | B2 | 7/2013 | Araujo Da Silva et al. |
| 8,492,479 | B2 | 7/2013 | Robert et al. |
| 8,883,929 | B2 | 11/2014 | Gandon-Pain et al. |
| 8,957,155 | B2 | 2/2015 | Seeboth et al. |
| 9,010,393 | B2 | 4/2015 | Araujo Da Silva et al. |
| 9,333,802 | B2 | 5/2016 | Thomasson et al. |
| 9,487,049 | B2 | 11/2016 | Lapra et al. |
| 9,598,560 | B2 | 3/2017 | Maillet, Jr. et al. |
| 2001/0034389 | A1 | 10/2001 | Vasseur |
| 2001/0036991 | A1 | 11/2001 | Robert et al. |
| 2001/0056138 | A1 | 12/2001 | Vasseur |
| 2002/0004549 | A1 | 1/2002 | Custodero et al. |
| 2002/0183436 | A1 | 12/2002 | Robert et al. |
| 2003/0202923 | A1 | 10/2003 | Custodero et al. |
| 2003/0212185 | A1 | 11/2003 | Vasseur |
| 2004/0030017 | A1 | 2/2004 | Simonot et al. |
| 2004/0051210 | A1 | 3/2004 | Tardivat et al. |
| 2004/0132880 | A1 | 7/2004 | Durel et al. |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2005/0032965 | A1 | 2/2005 | Valero |
| 2005/0171264 | A1 | 8/2005 | Simonot et al. |
| 2005/0267242 | A1 | 12/2005 | Custodero et al. |
| 2006/0009564 | A1 | 1/2006 | Simonot et al. |
| 2006/0093541 | A1 | 5/2006 | Uhrlandt et al. |
| 2006/0093773 | A1 | 5/2006 | Dujardin et al. |
| 2007/0112120 | A1 | 5/2007 | Vasseur |
| 2007/0197725 | A1 | 8/2007 | Chaves et al. |
| 2008/0085960 | A1 | 4/2008 | Chaves et al. |
| 2008/0132644 | A1 | 6/2008 | Lapra et al. |
| 2008/0161475 | A1 * | 7/2008 | York ............... B60C 1/0016 524/494 |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2009/0270558 | A1 | 10/2009 | Gandon-pain et al. |
| 2009/0292063 | A1 | 11/2009 | Robert et al. |
| 2009/0297827 | A1 | 12/2009 | Lapra et al. |
| 2010/0022714 | A1 | 1/2010 | Varagniat et al. |
| 2010/0145089 | A1 | 6/2010 | Mignani et al. |
| 2010/0184912 | A1 | 7/2010 | Marechal et al. |
| 2010/0221541 | A1 | 9/2010 | Valero et al. |
| 2010/0249270 | A1 | 9/2010 | Robert et al. |
| 2010/0252156 | A1 | 10/2010 | Robert et al. |
| 2011/0009547 | A1 | 1/2011 | Araujo Da Silva et al. |
| 2011/0021702 | A1 | 1/2011 | Gandon-Pain et al. |

(56) References Cited

U.S. PATENT DOCUMENTS

| | | |
|---|---|---|
| 2011/0152405 A1 | 6/2011 | Thomasson et al. |
| 2011/0152458 A1 | 6/2011 | Araujo Da Silva et al. |
| 2011/0263784 A1 | 10/2011 | Valero et al. |
| 2011/0294953 A1 | 12/2011 | Seeboth et al. |
| 2012/0208948 A1 | 8/2012 | Gandon-Pain et al. |
| 2015/0191584 A1 | 7/2015 | Maillet, Jr. et al. |

FOREIGN PATENT DOCUMENTS

| | | |
|---|---|---|
| EP | 0692492 A1 | 1/1996 |
| EP | 0692493 A1 | 1/1996 |
| EP | 0 735 088 A1 | 10/1996 |
| EP | 0735088 A1 | 10/1996 |
| EP | 0767206 A1 | 4/1997 |
| EP | 0778311 A1 | 6/1997 |
| EP | 0784072 A1 | 7/1997 |
| EP | 0786493 A1 | 7/1997 |
| EP | 0810258 A1 | 12/1997 |
| EP | 0881252 A1 | 12/1998 |
| EP | 1127909 A1 | 8/2001 |
| EP | 1994038 A2 | 11/2008 |
| EP | 2079793 A2 | 7/2009 |
| FR | 2740778 A1 | 5/1997 |
| FR | 2765882 A1 | 1/1999 |
| FR | 2 928 374 A1 | 9/2009 |
| WO | 97/36724 A2 | 10/1997 |
| WO | 99/02590 A1 | 1/1999 |
| WO | 99/02601 A1 | 1/1999 |
| WO | 99/02602 A1 | 1/1999 |
| WO | 99/06480 A1 | 2/1999 |
| WO | 99/09036 A1 | 2/1999 |
| WO | 99/16600 A1 | 4/1999 |
| WO | 99/28376 A1 | 6/1999 |
| WO | 00/05300 A1 | 2/2000 |
| WO | 00/05301 A1 | 2/2000 |
| WO | 00/73372 A1 | 12/2000 |
| WO | 01/92402 A1 | 12/2001 |
| WO | 02/10269 A1 | 2/2002 |
| WO | 02/30939 A1 | 4/2002 |
| WO | 02/31041 A1 | 4/2002 |
| WO | 02/053634 A1 | 7/2002 |
| WO | 02/083782 A1 | 10/2002 |
| WO | 03/002648 A1 | 1/2003 |
| WO | 03/002649 A1 | 1/2003 |
| WO | 03/016215 A1 | 2/2003 |
| WO | 03/016387 A1 | 2/2003 |
| WO | 03/106339 A1 | 12/2003 |
| WO | 2004/003067 A1 | 1/2004 |
| WO | 2004/009686 A1 | 1/2004 |
| WO | 2004/056915 A1 | 7/2004 |
| WO | 2006/023815 A2 | 3/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007/003408 A1 | 1/2007 |
| WO | 2007/017060 A1 | 2/2007 |
| WO | 2007/061550 A1 | 5/2007 |
| WO | 2007/098080 A2 | 8/2007 |
| WO | 2007/098120 A2 | 8/2007 |
| WO | 2008/003434 A1 | 1/2008 |
| WO | 2008/003435 A1 | 1/2008 |
| WO | 2008/055986 A2 | 5/2008 |
| WO | 2008/141702 A1 | 11/2008 |
| WO | 2009/000750 A1 | 12/2008 |
| WO | 2009/000752 A1 | 12/2008 |
| WO | 2009/062733 A2 | 5/2009 |
| WO | 2010/072685 A1 | 7/2010 |
| WO | 2013/190063 A1 | 12/2013 |

RUBBER COMPOSITION COMPRISING AT LEAST ONE SILICA AS INORGANIC REINFORCING FILLER

BACKGROUND

The invention relates to the field of rubber compositions reinforced by an inorganic filler, especially intended for the manufacture of tyres or of semi-finished products for tyres, in particular for treads of these tyres.

Rubber compositions determine the road performance of a tyre to a great extent. Initially, carbon black was used in rubber compositions as reinforcing filler with a view to limiting tyre wear.

However, since fuel savings and the need to protect the environment have become a priority, it has proved necessary to produce tyres having a reduced rolling resistance without adversely affecting their wear resistance.

Moreover, it is known in the field of tyres that one performance property is often improved to the detriment of another. This is the case for rolling resistance and wear resistance, since these performance properties are contradictory.

Tyre manufacturers therefore seek a compromise between these two performance properties.

This has especially been made possible by virtue of the use, in the treads of these tyres, of novel rubber compositions reinforced with inorganic fillers, in particular specific silicas of the highly dispersible type, which are capable of rivalling, from the reinforcing perspective, a conventional tyre-grade carbon black, while offering these compositions a lower hysteresis, which is synonymous with a lower rolling resistance for the tyres comprising them.

Treads containing, as filler, such highly dispersible silicas (denoted "HD" or "HDS" for "highly dispersible" or "highly dispersible silica"), of use in low rolling resistance tyres sometimes termed "green tyres" in reference to the energy saving afforded to the user ("green tyre concept"), have been widely described. Reference will especially be made to patent applications EP0501227, EP0692492, EP0692493, EP0735088, EP0767206, EP0786493, EP0881252, WO99/02590, WO99/02601, WO99/02602, WO99/06480, WO00/05300 and WO00/05301. These documents of the prior art teach the use of silicas of HD type having a specific surface area of between 100 and 250 m²/g.

Among these HD silicas, use is preferentially made of silicas with a high specific surface area. High specific surface area is generally intended to mean surface areas of at least 130 m²/g, or even greater than or equal to 150 m²/g. The benefit of using a silica with a high specific surface area lies mainly in the possibility of increasing the number of bonds between the silica and the elastomer and hence of increasing the level of reinforcement thereof. This is why it appears advantageous to use silicas with a high specific surface area in rubber compositions for tyre treads, in order especially to improve the wear resistance of these treads. By way of example of silica having a specific surface area of approximately 160 m²/g, mention may be made of the Zeosil® 1165MP silica sold by Solvay, the benchmark in the field of "green tyres".

However, it is known that increasing the specific surface area of a silica is done to the detriment of the hysteresis properties of the rubber compositions, which deteriorates the rolling resistance.

It still remains beneficial for tyre manufacturers to continue to improve the compromise of rolling resistance/wear resistance performance, especially by specifically modifying the morphology of a silica.

To this end, the applicant described, in its patent application WO 03/016387, a family of highly dispersible silicas having a higher specific surface area than that of the silicas known to date. These silicas afford the compositions containing them a significant improvement in wear resistance, without degrading the other properties of these compositions, and especially the rolling resistance.

In the pursuit of their research, the applicant has discovered, surprisingly, that a silica having a specific morphology, used as reinforcing inorganic filler in a rubber composition, makes it possible to achieve an excellent rolling resistance/wear resistance compromise. This compromise is superior to that afforded by the existing silicas with a high specific surface area which are usually used in the treads of "green tyres".

SUMMARY

Consequently, a first subject of the invention relates to a rubber composition based on at least one elastomer, a reinforcing inorganic filler, an agent for coupling the elastomer to the reinforcing inorganic filler, and a crosslinking system; said reinforcing inorganic filler comprising at least one silica S having:
- a CTAB specific surface area $S_{CTAB}$ within a range extending from 40 to 300 m²/g;
- a difference between the BET specific surface area $S_{BET}$ and the CTAB specific surface area $S_{CTAB}$ of greater than or equal to 35 m²/g;
- an aluminium content $W_{Al}$ within a range extending from 0.5 to 7.0% by weight relative to the weight of the silica S;
- a width of the aggregate size distribution Ld, measured by centrifugal sedimentation, of greater than or equal to 1.5; and
- a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A = [d50] + 0.782 \times [S_{CTAB}] - 8.524 \times [W_{Al}] \quad (I)$$

in which:
[d50] is the numerical value of d50, expressed in nm;
[$S_{CTAB}$] is the numerical value of $S_{CTAB}$, expressed in m²/g;
[$W_{Al}$] is the numerical value of $W_{Al}$, expressed in % by weight
relative to the weight of the silica S; and
said magnitude A satisfies the relationship (II):

$$A \geq 253 \quad (II).$$

Another subject of the present invention relates to a process for preparing a rubber composition as defined above, said process comprising the following steps:
at least one elastomer, at least one reinforcing inorganic filler and at least one agent for coupling the elastomer to the reinforcing inorganic filler are brought into contact; said reinforcing inorganic filler comprising at least one silica S having:
a CTAB specific surface area $S_{CTAB}$ within a range extending from 40 to 300 m²/g;

a difference between the BET specific surface area $S_{BET}$ and the CTAB specific surface area $S_{CTAB}$ of greater than or equal to 35 m²/g;

an aluminium content $W_{Al}$ within a range extending from 0.5 to 7.0% by weight relative to the weight of the silica S;

a width of the aggregate size distribution Ld, measured by centrifugal sedimentation, of greater than or equal to 1.5; and a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_{Al}] \quad (I)$$

in which:
[d50] is the numerical value of d50, expressed in nm;
[$S_{CTAB}$] is the numerical value of $S_{CTAB}$, expressed in m²/g;
[$W_{Al}$] is the numerical value of $W_{Al}$, expressed in % by weight
relative to the weight of the silica S; and
said magnitude A satisfies the relationship (II):

$$A\geq253 \quad (II);$$

everything is kneaded thermomechanically, once or several times, until a maximum temperature of between 110° C. and 190° C. is reached;

the mixture from the preceding step is cooled to a temperature below 100° C., a crosslinking system is incorporated into the cooled mixture from the preceding step, the mixture comprising the crosslinking system is kneaded up to a maximum temperature below 110° C.

Another subject of the invention relates to a semi-finished article, especially for a tyre, comprising at least one composition as defined above or capable of being obtained according to the process described above. Preferentially, this semi-finished article is a tread, especially for a tyre.

Another subject of the present invention is a tyre comprising at least one composition as defined above or capable of being obtained according to the process described above.

Another subject of the present invention is a tyre comprising at least one semi-finished article as defined above.

I—DETAILED DESCRIPTION OF THE INVENTION

I.1 Measurements and Tests Used

Characterization of the Silicas

The silicas are characterized as indicated below.

Measurement of the CTAB Specific Surface Area ($S_{CTAB}$)

Principle of the Measurement

The values of CTAB specific surface area ($S_{CTAB}$) were determined according to an internal procedure derived from the standard NF ISO 5794-1, appendix G of June 2010. The process is based on the adsorption of CTAB (N-hexadecyl-N,N,N-trimethylammonium bromide) to the "outer" surface of the silica.

The CTAB is left to adsorb to the silica in aqueous suspension, with magnetic stirring. After separation of the liquid phase using a centrifuge, the excess non-adsorbed CTAB is determined by filtration with sodium bis(2-ethylhexyl)sulfosuccinate salt (referred to as "OT" in the remainder of the description) using a titroprocessor, the titration point being given by the turbidity maximum of the solution and determined by phototrode.

Apparatus Used

Precision balance accurate to $\frac{1}{10}^{th}$ of a mg, Mettler Toledo AS205;

Magnetic stirrer able to turn at a speed of 1100 rpm;

seven easy type pH meter, Mettler Toledo, fitted with a pH electrode of InLab Expert Pro type, Mettler Toledo;

T70 type automatic titration equipment, Mettler Toledo, fitted with a DP5 phototrode set to 555 nm;

Timer, the working unit of which is the second;

Titration beaker, of plastic 125 ml beaker type, Mettler Toledo;

50 and 500 ml sampling cylinders;

Centrifuge able to turn at a speed of 8000 rpm;

Mortar and pestle;

50 ml capacity centrifuge tubes, suitable for the centrifuge, with screw cap;

1 litre, class A volumetric flasks;

Teflon-coated magnetic stirrer bars;

10 ml and 20 ml class A⁺ precision graduated pipettes with two marks;

50 ml class A precision burette;

high-form weighing bottle made of borosilicate glass, provided with cover, of 40 ml capacity, for example Ø 35, H 70 mm;

low-form weighing bottle, 50 mm diameter, with capping cover;

natural ventilation oven, Memmert UM100;

desiccator;

150 μm sieve and sieve support.

Reagents

All the reagents must be of recognized analytical quality. The water used must be demineralized water.

Sodium carbonate ($Na_2CO_3$) with a purity greater than 99%;

Sodium bicarbonate ($NaHCO_3$) with a purity greater than 99%;

Hexadecyltrimethylammonium bromide (CTAB; $C_{19}H_{42}BrN$) with a purity greater than 99%;

Sodium bis(2-ethylhexyl)sulfosuccinate (OT; $C_{20}H_{37}O_7SNa$) with a purity greater than 99%;

Demineralized water.

Preparation of the Solutions

Preparation of the pH 9.54 Buffer Solution
$c(HCO_3^-/CO_3^{2-})=0.054$ mol/l

In a 1 litre volumetric flask containing 500 ml of demineralized water, the following are added:

4.5470±0.003 g of sodium carbonate ($Na_2CO_3$);

9.3585±0.003 g of sodium bicarbonate ($NaHCO_3$).

After dissolving the solids, the volumetric flask is filled to the graduation mark with demineralized water and homogenization is carried out with magnetic stirring for 10 minutes at 250 rpm.

The pH of the solution is checked with the pH meter; it must be 9.54±0.1.

Hexadecyltrimethylammonium Bromide (CTAB) Solution, c(CTAB)=0.015 mol/l 5.50±0.005 g of CTAB are dissolved in a 1 litre volumetric flask containing 350 ml of the buffer solution and approximately 500 ml of demineralized water. Demineralized water is added up to the graduation mark.

Homogenization is carried out with magnetic stirring for approximately 10 hours at a speed of 250 rpm.

The pH of the solution is checked with the pH meter; it must be 9.6±0.1.

At no time must the temperature of this solution fall below 22° C., the recrystallization temperature.

The solution can be used for 24 hours after its preparation. The use-by date of this solution is 15 days.

Sodium bis(2-ethylhexyl)sulfosuccinate (OT) Solution, c(OT)=0.00389 mol/l

In a 1 litre volumetric flask containing 500 ml of demineralized water, the following are dissolved:

1.730±0.005 g of OT; demineralized water is added up to the graduation mark, and stirring is carried out with a magnetic stirrer for 10 h at 250 rpm.

This solution is to be used 12 days after its preparation. The use-by date of this solution is 2 months. Once opened, the solid reagent must be stored in a desiccator.

Test Conditions

The test must be performed at a temperature of 24° C.±2° C.

It is recommended that the reagents and apparatuses are brought to the equilibrium temperature of the room.

The CTAB solution must not be stored at a temperature below 22° C. This causes slow recrystallization.

Before any analysis, the reagents are homogenized under magnetic stirring for 15 minutes at 250 rpm.

Before any analysis, the burette circuits must be purged and the absence of air bubbles in the circuits must be verified.

Before any analysis, the phototrode is rinsed with ethanol, then with demineralized water, then conditioned for 30 minutes in a beaker containing 50 ml of demineralized water.

The potential of the demineralized water in the phototrode must be 1000±5 mV, which corresponds to 100% transmission.

Determining the Blank Test

The blank test makes it possible to determine the amount of OT required for the titration of 10 ml of CTAB solution.

10.0 ml of CTAB solution are taken off and decanted into a beaker for titration. 50 ml of demineralized water are added using the sampling cylinder.

The assay is carried out with the following parameters:
End point value: 200 mV;
Max rate: 10 ml/min;
Min rate: 10 µl/min.
Two assays are carried out.

The volumes in ml of OT solution determined during the two blank tests are denoted $V_2$ and $V_3$.

The mean volume $V_4$ is calculated as follows:

$$V_4 = \frac{V_2 + V_3}{2}$$

Adsorption of the CTAB by the Silica

The sample of silica is reduced to powder using a pestle and mortar then passed through the 150 µm sieve.

0.35±0.005 g of the sieved sample of silica are weighed and this weight of test sample is denoted P1.

The test sample is carefully introduced into a weighing bottle and a magnetic stirrer bar is introduced into the weighing bottle.

30.0 ml of the CTAB solution are then introduced and placed under magnetic stirring at 1100 rpm for 40 minutes.

Separation of the Silica

Immediately after adsorption of the silica, the whole suspension is decanted into a centrifuge tube.

The silica is separated from the suspension by centrifugation at 8000 rpm for 30 minutes.

Assay of the CTAB after Adsorption

Using a pipette, 10.0 ml of the supernatant CTAB solution are taken off directly from the centrifuge tube, taking care not to entrain any silica.

Decanting is carried out into a titration beaker, and 50 ml of demineralized water are added using the sampling cylinder. The assay is carried out with the following parameters:
End point value: 250 mV;
Max rate: 10 ml/min;
Min rate: 5 µl/min.
The volume of OT consumed is noted V1.

Moisture Content of the Silica

The moisture content (% $H_2O$) for each silica sample is determined by the loss of weight from the sample after placing in an oven at 105° C. for 2 hours. For this purpose, the weight of a weighing bottle and a capping cover are weighed on the precision balance, this weight $m_0$ is noted; then, approximately exactly 2 g of the silica sample to be tested are weighed rapidly. The cover is placed on the bottle once the silica has been weighed, and the weight $m_1$ of the assembly of weighing bottle, cover and sample is noted. The cover is then removed and the weighing bottle containing the silica is introduced into the natural ventilation oven set at 105±5° C. for 2 hours, the oven being pre-heated to the prescribed temperature.

The assembly of weighing bottle and sample is removed from the oven, the cover is replaced on the bottle, and the assembly is placed in the desiccator for cooling until it returns to ambient temperature. The assembly is weighted and the weight $m_2$ is noted.

The moisture content, expressed as percentage by weight, is then obtained according to the following formula:

$$\% \text{H2O} = \frac{(m_1 - m_0) - (m_2 - m_0)}{(m_1 - m_0)} \times 100$$

$m_0$: weight of the weighing bottle and the cover; in grams;
$m_1$: weight of the assembly of weighing bottle, cover, and silica sample, before being placed in the oven; in grams;
$m_2$: weight of the assembly of weighing bottle, cover, and silica sample, after removal from the oven; in grams.

Expression of the Results

The CTAB adsorption index is given by the following relationship:

$$CT\,AB\,d'\text{adsorption index }(m^2/g) = \frac{V_4 - V_1}{V_4} \times \frac{(0.165 \times 578.116)}{P1\frac{(100 - \%H2O)}{100}}$$

where:
0.165 g=weight of CTAB contained in 30.0 ml of solution;
$V_4$ in ml=mean volume of OT solution poured for the blank test;
$V_1$ in ml=volume of OT solution poured for the test assay;
P1 in g=weight of crude test sample;
% $H_2O$=moisture content of the silica.

Measurement of the BET Specific Surface Area ($S_{BET}$)

The BET specific surface area of the silica is determined by gas adsorption using the Brunauer-Emmett-Teller method described in "The Journal of the American Chemical Society", (Vol. 60, page 309, February 1938), and more specifically according to a method derived from the standard NF ISO 5794-1, appendix E, of June 2010 [multipoint (5 point) volumetric method—gas: nitrogen—degassing under vacuum: one hour at 160° C.—relative pressure p/po range: 0.05 to 0.2].

Measurement of the Aluminium Content ($W_{Al}$)

The Al content is (also denoted $W_{Al}$) is the content of aluminium, that is to say of the metallic chemical element. It is determined by inductively coupled plasma atomic emission spectroscopy (ICP-AES).

Apparatus

Precision balance, to 0.1 mg scale,
Funnels,
100 ml class A volumetric flasks,
250 ml class A volumetric flasks,
Platinum dishes,
0.1-1 ml variable-volume calibrated micropipette (e.g.: Eppendorf),
0.5-5 ml variable-volume calibrated micropipette (e.g.: Eppendorf),
Syringe filters made of cellulose acetate, with pore diameter of 0.45 µm,
20 ml sample holders,
ICP spectrometer (e.g.: Jobin Yvon, Activa M model),
sand bath.

Reagents

Ultrapure water
Concentrated hydrochloric acid (e.g.: VWR ref: 20252.290)
d=1.18
% HCl=37
Concentrated sulfuric acid (e.g.: VWR ref: 1.00731.1000)
d=1.84
% $H_2SO_4$=95-97
Concentrated hydrofluoric acid (e.g.: VWR ref: 20307.290)
d=1.13
% HF=40
1 g/l aluminium standard solution (VWR ref 1.19770.0500)

Operating Procedure

Preparation of the silica sample to be tested:
Weigh approximately precisely 100 mg of silica to be tested into a platinum dish;
Add a few millilitres of demineralized water and 3 drops of concentrated sulfuric acid;
Add 10 ml of concentrated hydrofluoric acid;
Evaporate to dryness on sand bath;
Add a further 10 ml of hydrofluoric acid, evaporate to dryness;
Repeat this operation a third time;
Leave the dish to cool;
Take up the sample again in 10 ml of concentrated hydrochloric acid for several minutes;
Once the acid has cooled, decant the sample into a 200 ml flask containing demineralized water and add demineralized water up to the graduation mark.
Preparation of the blank:
In a platinum dish, add a few millilitres of demineralized water and 3 drops of concentrated sulfuric acid;
Add 10 ml of concentrated hydrofluoric acid;
Evaporate to dryness on sand bath;
Add a further 10 ml of hydrofluoric acid, evaporate to dryness;
Repeat this operation a third time;
Leave the dish to cool;
Take up the sample again in 10 ml of concentrated hydrochloric acid for several minutes;
Once the acid has cooled, decant the sample into a 200 ml flask containing demineralized water and add demineralized water up to the graduation mark.

Preparation of the Calibration Range

The calibration range is composed of 5 standards prepared in 100 ml flasks from a commercial 1000 mg/l aluminium solution, according to the following table I:

TABLE I

| Standard no. | St 0 | St 1 | St 2 | St 3 | St 4 |
|---|---|---|---|---|---|
| Concentration Al (mg/l) | 0 | 2.5 | 5 | 7.5 | 10 |
| Volume of solution Al 1000 mg/l (µl) | 0 | 250 | 500 | 750 | 1000 |
| Concentrated hydrochloric acid (ml) | 5 | 5 | 5 | 5 | 5 |

St = Standard

Preparation of the Validation Control

The validation control is prepared in the same way as the standard St 2 of the calibration range, using a 1000 mg/l aluminium solution in a 100 ml flask, according to the following table II.

TABLE II

|  | Validation control |
|---|---|
| Concentration Al (mg/1) | 5 |
| Volume of solution Al 1000 mg/1 (µl) | 500 |
| Concentrated hydrochloric acid (ml) | 5 |

ICP-AES Assay

Analyse the solutions obtained by ICP-AES (cf. instrument parameters).

Lines Used

Jobin Yvon Activa ICP-AES

| Aluminium | $\lambda = 394.401$ nm |
|---|---|
|  | $\lambda = 396.152$ nm |

Analysis Sequence

1—Calibration;
2—Validation control;
3—Blank;
4—Samples.

The Jobin Yvon Activa ICP-AES instrument parameters are presented in the following table III:

TABLE III

| Plasma power | 1100 | Watts |
|---|---|---|
| Pump speed | 20 | rpm |
| Argon plasma flow rate | P1 | l/min |
| Sheath gas flow rate | G1 | l/min |
| Auxiliary gas flow rate | 0 | l/min |
| Spray flow rate | 0.02 | l/min |
| Spray pressure | 1 | bar |
| Rinsing time | 30 | sec |
| Transfer time | 60 | sec |
| Stabilization time | 25 | sec |

Results

The aluminium content ($W_{Al}$) of the silica tested is given by the following relationship (IV):

$$\% Al = \frac{(C - Cb) * V * 100}{PE} \quad \text{IV}$$

with: C: concentration in mg/l of aluminium in the sample;
Cb: concentration in mg/l of aluminium in the blank;
V: volume of the volumetric flask in l (in this instance 0.200l);
PE: test sample in mg of sample;

Measurement of the Parameters d16, d50, d84 and Ld

The values d16, d50, d84 and Ld are measured by means of a centrifugal photosedimentometer of CPS DC24000 UHR type, which is sold by CPS Instruments. This apparatus is equipped with operating software provided with the apparatus (operating software version 11 g).

For the purposes of the measurements, the following equipment and products are also used:
Ultrasound system: 1500-watt generator of Sonics Vibracell VCF1500 type, equipped with a Sonics Vibracell CV154 type converter, with a Sonics Vibracell BHN15GD (×1.5) type booster, and a Sonics Vibracell 207-10 19 mm probe, with interchangeable 19 mm Sonics Vibracell 630-0407 type tip;
0.1 mg precision analytical balance (for example the Mettler Toledo model) CP504);
Syringes: 1.0 ml and 2.0 ml with 0.81 mm diameter needles;
High form 50 ml glass beaker (SCHOTT DURAN: 38 mm diameter, 70 mm high); magnetic stirrer with 2 cm stirrer bar;
Container for ice bath of crystallizer type;
Chemical products: deionized water; 96% ethanol; 99% sucrose (CAS no. 57-50-1); dodecane; all supplied by Sigma; PVC calibration standard provided by CPS Instrument, Inc. The maximum of the peak of the calibration standard used must be located between 200 and 600 nm, for example 239 nm.

Pre-Setting and Configuring the Instrument

For the measurements, the parameters according to table IV are input into the instrument's software. The data relating to the PVC calibration standard are provided by the supplier of said standard.

TABLE IV

| Sample Parameters | | |
|---|---|---|
| Max. Diameter. | µm | 0.79 |
| Min. Diameter. | µm | 0.02 |
| Particle Density | g/cm$^3$ | 2.11 |
| Particle Refractive index |  | 1.46 |
| Particle absorption |  | 0.001 |
| Non-sphericity factor |  | 1 |
| Calibration Standard Parameters | | |
| Peak diameter | µm | 0.239 |
| Half height peak width | µm | 0.027 |
| Particle density | g/cm$^3$ | 1.385 |
| Fluid Parameters | | |
| Fluid density | g/cm$^3$ | 1.051 |
| Fluid refractive index |  | 1.3612 |
| Fluid viscosity | cps | 1.28 |
| Configuration of the system | | |
| Wavelength | nm | 405 | cps = centipoise

The following parameters for treatment options are set according to the following table V:

TABLE V

| | |
|---|---|
| Force baseline | Yes |
| Correct for Non-Strokes Fluids: | No |
| Extra Software Noise filtering: | No |
| Baseline Drift Display: | Show |
| Calibration method: | External |
| Sample per calibration: | 1 |

All the other options in the software are left as set by default by the manufacturer of the instrument.

Preparation of the Sedimentation Gradient

The centrifuge disc is set to rotate at 24 000 rpm for 30 min. The sucrose solution density gradient is prepared in the following manner: An aqueous solution containing 24% by weight of sucrose is prepared in a 50 ml beaker. An aqueous solution containing 8% by weight of sucrose is prepared in a second 50 ml beaker. Once these two solutions have been homogenized separately, samples are taken from each of these solutions using a 2 ml syringe, and these samples are injected into the rotating disc according to the following order:
Sample 1: 1.8 ml of the 24% solution;
Sample 2: 1.6 ml of the 24% solution+0.2 ml of the 8% solution;
Sample 3: 1.4 ml of the 24% solution+0.4 ml of the 8% solution;
Sample 4: 1.2 ml of the 24% solution+0.6 ml of the 8% solution;
Sample 5: 1.0 ml of the 24% solution+0.8 ml of the 8% solution;
Sample 6: 0.8 ml of the 24% solution+1.0 ml of the 8% solution;
Sample 7: 0.6 ml of the 24% solution+1.2 ml of the 8% solution;
Sample 8: 0.4 ml of the 24% solution+1.4 ml of the 8% solution;
Sample 9: 0.2 ml of the 24% solution+1.6 ml of the 8% solution;
Sample 10: 1.8 ml of the 8% solution.

Before each injection into the disc, the 2 solutions are homogenized in the syringe by suctioning approximately 0.2 ml of air followed by a brief manual agitation for a few seconds, making sure not to lose any liquid.

These injections, the total volume of which is 18 ml, have the aim of creating a density gradient which is useful for eliminating certain instabilities which may appear during the injection of the sample to be measured. In order to protect this gradient from evaporation, 1 ml of dodecane is added into the rotating disc by means of a 2 ml syringe. The disc is then left rotating at 24 000 rpm for 60 min before any first measurement (rpm=revolutions per minute).

Preparation of the Silica Sample to be Analysed 3.2 g of silica are weighed into a high form 50 ml glass beaker (SCHOTT DURAN: diameter 38 mm, height 70 mm), and 40 ml of deionized water are added. The suspension is placed under magnetic stirring with a 2 cm magnetic stirrer bar at 300 rpm (rpm=revolutions per minute) for at least 20 sec, then the magnetic stirrer bar is removed and the beaker is placed in a crystallizer filled with an ice bath. The ultrasound probe is then immersed in the beaker, the end of the probe being located 1 cm beneath the air-liquid interface. It is advisable to ensure that the interchangeable tip transmitting the ultrasound waves to the suspension has an acceptable state of wear before starting up the generator.

As is known to those skilled in the art, an acceptable state of wear is usually considered to be a surface state that does not have any visually perceptible roughness. As a reference for an unacceptable state of wear, use may be made, for example, of the right-hand image on FIG. 3, page 14, published in "Preparation of Nanoparticle Dispersions from Powdered Material Using Ultrasonic Disruption, version 1.1, [J. S. Taurozzi, V. A. Hackley, M. R. Wiesner], National Institute of Standards and Technology Special Publication 1200-2, June 2012" (CODEN NSPUE, publication available using the digital identifier dx.doi.org/10.6028/NIST.SP.1200-2). The generator of the probe is set to 60% of its maximum power, and the silica suspension is subjected to ultrasound waves for 8 min. At the end of the ultrasound treatment, the suspension is once again placed under magnetic stirring. The sample is taken under stirring.

Analysis

Before each injection of the sample to be measured, 100 µl of the suspension containing the standard PVC particles supplied by CPS Instruments, the characteristics of which have been recorded in the software beforehand, are injected into the disc. It is advisable to begin the measurement in the software simultaneously with this first injection, and to wait for confirmation from the apparatus before being able to inject 100 µl of the silica suspension subjected to ultrasound beforehand, ensuring once again that the measurement is started simultaneously with the injection. These injections are carried out by means of 1 ml syringes.

At the end of the measurement, which is reached after the time required for all the particles of smallest diameter (configured in the software at 0.02 µm) to sediment, the software provides the relative proportions by weight for each class of diameter measured. This curve obtained in this way is referred to as the aggregate size distribution.

The integration of the aggregate size distribution as a function of the diameter makes it possible to obtain what is referred to as a "cumulative" distribution; that is to say, the total weight of aggregates between the minimum diameter measured and a diameter of interest.

Results

The values of d50, d16, d84 and Ld result from the cumulative distributions and are calculated as follows, on the basis of a linear scale:
d50 is the diameter below and above which 50% of the population of aggregates, by weight, are found. d50 is referred to as the median diameter of the silica aggregates. It is expressed in nm.
d84 is the diameter below which 84% of the population of aggregates, by weight, are found. It is expressed in nm.
d16 is the diameter below which 16% of the population of aggregates, by weight, are found. It is expressed in nm.
Ld: represents the width of the aggregate size distribution. It is calculated according to the equation Ld=(d84−d16)/d50. Ld is a dimensionless number.

Characterization of the Rubber Compositions

The rubber compositions are characterized, after curing, as indicated below.

Dynamic Properties

The dynamic property tan(δ) is measured on a viscosity analyser (Metravib VA4000) according to Standard ASTM D 5992-96.

Measurement at a temperature of 23° C.:

The response of a sample of crosslinked composition (cylindrical test specimen with a thickness of 4 mm and a cross section of 400 mm$^2$), subjected to a simple alternating sinusoidal shear stress, at a frequency of 10 Hz, at 23° C., according to Standard ASTM D 5992-96, is recorded. A peak-to-peak strain amplitude sweep is carried out from 0.1% to 100% (outward cycle) and then from 100% to 0.1% (return cycle). The result made use of is the loss factor (tan (δ)). For the return cycle, the maximum value of tan(δ) observed (tan(δ)max at 23° C.) is indicated.

The results are indicated in base 100, the arbitrary value of 100 being assigned to the control in order to then calculate and compare tan(δ)$_{max}$ at 23° C. of the different samples tested. The value in base 100 for the sample to be tested is calculated according to the operation: (value of tan(δ)max at 23° C. of the sample to be tested/value of tan(δ) max at 23° C. of the control)×100. In this way, a result of less than 100 indicates a reduction in hysteresis (hence an improvement in the hysteresis properties), which corresponds to an improvement in the rolling resistance performance.

Abrasion Resistance

The abrasion resistance is measured according to standard NF ISO 4649 of November 2010, which consists in determining the volume loss of a sample after a displacement of 40 linear metres on standardized abrasive paper.

More particularly, the volume loss by abrasion is determined according to the indications of standard NF ISO 4649 of November 2010 (method B), using an abrasion tester in which the cylindrical test specimen is subjected to the action of an abrasive gauze of P60 grains attached to the surface of a rotating drum under a contact pressure of 5 N (N=Newton) and over a course of 40 m. A loss of weight of the sample is measured and the volume loss is calculated according to the density (ρ) of the material constituting the test specimen. The density (ρ) of the material constituting the test specimen is conventionally obtained on the basis of the fractions by weight of each constituent of the material and their respective densities (ρ).

The results are indicated in base 100, the arbitrary value of 100 being assigned to the control in order to then calculate and compare the substance volume loss of the different samples tested. The value in base 100 for the sample to be tested is calculated according to the operation: (value of the substance volume loss of the sample to be tested/value of the substance volume loss of the control)×100. In this way, a result of less than 100 indicates a decrease of the volume loss and therefore an improvement in abrasion resistance, which corresponds to an improvement in wear resistance performance. On the contrary, a result greater than 100 indicates an increase of the volume loss and thus a decrease in abrasion resistance, which corresponds to a decrease in the wear resistance performance.

Characterization of the Other Constituents of the Composition

Glass Transition Temperature Tg

The glass transition temperature Tg is measured in a known way by DSC (Differential Scanning calorimetry) according to standard ASTM D3418, 1999.

Microstructure of the Polymers

Near-infrared spectroscopy (NIR) is used to quantitatively determine the content by weight of styrene in the elastomer and its microstructure (relative distribution of the 1,2-vinyl-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] performed using standard elastomers having a composition determined by $^{13}$C NMR. The styrene content and the microstructure are then calculated from the NIR spectrum of an elastomer film having a thickness of approximately 730 μm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

I.2 Embodiment of the Invention

The rubber compositions especially intended for the manufacture of tyres or of semi-finished products for tyres in accordance with the invention are based on at least one elastomer, a reinforcing inorganic filler, an agent for coupling the elastomer to the reinforcing inorganic filler, and a crosslinking system; said reinforcing inorganic filler comprising at least one silica S having:

- a CTAB specific surface area $S_{CTAB}$ within a range extending from 40 to 300 m$^2$/g;
- a difference between the BET specific surface area $S_{BET}$ and the CTAB specific surface area $S_{CTAB}$ of greater than or equal to 35 m$^2$/g;
- an aluminium content $W_{Al}$ within a range extending from 0.5 to 7.0% by weight relative to the weight of the silica S;
- a width of the aggregate size distribution Ld, measured by centrifugal sedimentation, of greater than or equal to 1.5; and
- a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_{Al}] \quad (I)$$

in which:
[d50] is the numerical value of d50, expressed in nm;
[$S_{CTAB}$] is the numerical value of $S_{CTAB}$, expressed in m$^2$/g;
[$W_{Al}$] is the numerical value of $W_{Al}$, expressed in % by weight
relative to the weight of the silica S; and
said magnitude A satisfies the relationship (II):

$$A \geq 253 \quad (II).$$

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

"Silica aggregate" is intended to mean, for the purposes of the present invention, in a known way, an assembly of indivisible primary particles (i.e. which cannot be cut, divided, split) produced during silica synthesis. A silica aggregate represents the smallest unit dispersible in a mixture.

In the present description, unless expressly indicated otherwise, all the percentages (%) shown are percentages by weight.

Furthermore, any range of values denoted by the expression "between a and b" represents the range of values extending from more than "a" to less than "b" (that is to say, limits a and b excluded), while any range of values denoted by the expression "from a to b" means the range of values extending from "a" up to "b" (that is to say, including the strict limits a and b).

The abbreviation "phr" (per hundred parts of rubber) means parts by weight per hundred parts by weight of elastomers (of the total of the elastomers, if several elastomers are present) or rubber present in the rubber composition.

In the remainder of the present application, the terms "silica" and "precipitated silica" are synonymous.

In order to avoid any ambiguity, the symbol "×" used in the equations, especially in equation (I), represents the multiplication sign. Thus, the expression "a×b" means "a" multiplied by "b".

Within the context of the invention, the carbon-based products mentioned in the description may be of fossil or biobased origin. In the latter case, they may partially or completely result from biomass or be obtained from renewable starting materials resulting from biomass. Polymers, plasticizers, fillers, etc., are especially concerned.

Elastomer

The rubber compositions in accordance with the invention comprise at least one elastomer, that is to say one elastomer or a mixture of several elastomers. Elastomers are polymers well known to those skilled in the art.

Preferentially, the elastomer is a diene elastomer.

More preferentially, the elastomer is a synthetic diene elastomer.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomer(s) (i.e. monomer(s) bearing two conjugated or non-conjugated carbon-carbon double bonds).

Diene elastomers can be classified into two categories: "essentially unsaturated" or "essentially saturated". "Essentially unsaturated" is generally intended to mean a diene elastomer resulting at least in part from conjugated diene monomers having a molar content of units of diene origin (conjugated dienes) which is greater than 15% (mol %); thus, diene elastomers such as butyl rubbers or copolymers of dienes and of α-olefins of EPDM type do not fall under the preceding definition and may especially be termed "essentially saturated" diene elastomers (low or very low molar content, always less than 15% (mol %), of units of diene origin). In the category of "essentially unsaturated" diene elastomers, "highly unsaturated" diene elastomer is intended to mean in particular a diene elastomer having a molar content of units of diene origin (conjugated dienes) which is greater than 50% (mol %).

Given these definitions, "diene elastomer capable of being used in the rubber compositions in accordance with the invention" is intended more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidene norbornene or dicyclopentadiene;
(d) a copolymer of isobutene and of isoprene (butyl rubber) and also the halogenated versions, in particular chlorinated or brominated versions, of this type of copolymer.

Although it applies to any type of elastomer, especially diene elastomer, those skilled in the art will understand that the present invention is preferably employed with essentially unsaturated diene elastomers, in particular of the above type (a) or (b).

In the case of copolymers (b), the latter may contain from 20% to 99% by weight of diene units and from 1% to 80% by weight of vinylaromatic units.

As conjugated dienes, the following are especially suitable: 1,3-butadiene, 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, or 2,4-hexadiene.

The following, for example, are suitable as vinylaromatic compounds: styrene, ortho-, meta- or para-methyl styrene, the "vinyltoluene" commercial mixture, para-(tert-butyl) styrene, methoxystyrenes, chlorostyrenes, vinylmesitylene, divinylbenzene or vinylnaphthalene.

Preferentially, the diene elastomer(s) of the composition according to the invention may be selected preferentially from the group of diene elastomers consisting of polybutadienes (abbreviated to BRs), synthetic polyisoprenes (abbreviated to IRs), natural rubber (abbreviated to NR), butadiene copolymers, isoprene copolymers and the mixtures of these elastomers. Such copolymers are more preferentially selected from the group consisting of butadiene/styrene copolymers (abbreviated to SBRs), whether the latter are prepared by emulsion polymerization (ESBR) or solution polymerization (SSBR), isoprene/butadiene copolymers (abbreviated to BIRs), isoprene/styrene copolymers (abbreviated to SIRs) and isoprene/butadiene/styrene copolymers (abbreviated to SBIRs). Preferably, the diene elastomer is selected from the group consisting of polybutadienes (BRs), butadiene/styrene copolymers (SBRs), isoprene/butadiene copolymers (BIRs), isoprene/styrene copolymers (SIRs), isoprene/butadiene/styrene copolymers (SBIRs) and the mixtures of these copolymers.

Among the diene elastomers, the following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418, 1999) of between 0° C. and −70° C. and more particularly between −10° C. and −60° C., a styrene content of between 5% and 60% by weight and more particularly between 20% and 50% by weight, a content (mol %) of 1,2-bonds of the butadiene part of between 4% and 75% and a content (mol %) of trans-1, 4-bonds of between 10% and 80%, butadiene/isoprene copolymers and especially those having an isoprene content of between 5% and 90% by weight and a Tg ranging from −40° C. to −80° C., or isoprene/styrene copolymers and especially those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are especially suitable.

According to a specific embodiment, the diene elastomer is predominantly (i.e., for more than 50 phr) an SBR, whether this is an SBR prepared in emulsion ("ESBR") or an SBR prepared in solution ("SSBR"), or an SBR/BR, SBR/NR (or SBR/IR), BR/NR (or BR/IR) or else SBR/BR/NR (or SBR/BR/IR) blend (mixture). In the case of an SBR (ESBR or SSBR) elastomer, use is especially made of an SBR having a moderate styrene content, for example of between 20% and 35% by weight, or a high styrene content, for example from 35% to 45% by weight, a content (mol %) of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another specific embodiment of the invention, the diene elastomer of the composition according to the invention comprises a blend (mixture) of a BR (as low Tg elastomer) having a content (mol %) of cis-1,4-linkages of greater than 90% with one or more S-SBRs or E-SBRs (as high Tg elastomer(s)).

The elastomers may have any microstructure, which depends on the polymerization conditions used, especially on the presence or absence of a modifying and/or randomizing agent and on the amounts of modifying and/or randomizing agent employed. These elastomers may, for example, be block, random, sequential or microsequential elastomers and be prepared in dispersion or in solution; they may be coupled and/or star-branched or else functionalized with a coupling and/or star-branching or functionalization agent.

Preferentially, the elastomer is a functionalized diene elastomer.

Preferably, the functionalized diene elastomer is a functionalized butadiene/styrene copolymer.

"Functionalized diene elastomer" is intended to mean a synthetic diene elastomer that comprises at least one chemical group comprising one or more heteroatoms, such as, for example, a sulfur atom S, a nitrogen atom N, an oxygen atom O, a silicon atom Si, or a tin atom Sn. Within the context of the present description, this chemical group is also referred to as "function". The two terms are used without distinction.

This chemical group may be located at the chain end, that is to say at one end of the linear main elastomer chain. It will then be said that the diene elastomer is functionalized "at the chain end". It is generally an elastomer obtained by reaction of a living elastomer with a functionalization agent, that is to say any at least monofunctional molecule, the function being any type of chemical group known by those skilled in the art to react with a living chain end.

This chemical group may be located in the linear main elastomer chain. It will then be said that the diene elastomer is coupled or else functionalized "in the middle of the chain", in contrast to the position "at the chain end", although the group is not located precisely at the middle of the elastomer chain. It is generally an elastomer obtained by reaction of two chains of the living elastomer with a coupling agent, that is to say any at least difunctional molecule, the function being any type of chemical group known by those skilled in the art to react with a living chain end.

This group may be central, to which n elastomer chains (n>2) are bonded, forming a star-branched structure of the elastomer. It will then be said that the diene elastomer is star-branched. It is generally an elastomer obtained by reaction of n chains of the living elastomer with a star-branching agent, that is to say any polyfunctional molecule, the function being any type of chemical group known by those skilled in the art to react with a living chain end.

Those skilled in the art will understand that a functionalization reaction with an agent comprising more than one function which is reactive with regard to the living elastomer results in a mixture of entities functionalized at the chain end and in the middle of the chain, constituting the linear chains of the functionalized diene elastomer, and also, if appropriate, star-branched entities. Depending on the operating conditions, mainly the molar ratio of the functionalization agent to the living chains, certain entities are predominant in the mixture.

Preferentially, the functionalized diene elastomer comprises at least one polar function comprising at least one oxygen atom.

Preferentially, the polar function may be selected from the group consisting of silanol, alkoxysilanes, alkoxysilanes bearing an amine group, epoxide, ethers, esters, carboxylic acids and hydroxyl. The polar function especially improves the interaction between the reinforcing inorganic filler and the elastomer. Such functionalized elastomers are known per se and are described especially in the following documents: FR2740778, U.S. Pat. No. 6,013,718, WO2008/141702, FR2765882, WO01/92402, WO2004/09686, EP1127909, U.S. Pat. No. 6,503,973, WO2009/000750 and WO2009/000752.

The functionalized diene elastomer is preferably a diene elastomer comprising a polar function that is a silanol.

Preferentially, the silanol is located at the chain end or in the middle of the chain of the main chain of the functionalized diene elastomer. More preferentially, the silanol is located at the chain end of the main chain of the functionalized diene elastomer.

Preferably, the functionalized diene elastomer is a diene elastomer (especially an SBR) in which the silanol function is located at the chain end. This functionalized diene elastomer comprises, at one end of the main chain thereof, a silanol function or a polysiloxane group having a silanol end of formula —(SiR$_1$R$_2$—O—)mH with m representing an integer with a value ranging from 3 to 8, preferably 3, R$_1$ and R$_2$, which are identical or different, represent an alkyl radical with 1 to 10 carbon atoms, preferably an alkyl radical having 1 to 4 carbon atoms.

This type of elastomer may be obtained according to the processes described in document EP0778311 and more particularly according to the process consisting, after a step of anionic polymerization, in functionalizing the living elastomer with a functionalization agent of cyclic polysiloxane type, as long as the reaction medium does not allow the polymerization of the cyclopolysiloxane. As cyclic polysiloxanes, mention may be made of those corresponding to formula (V):

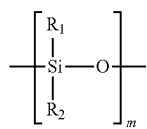
(V)

where m represents an integer with a value ranging from 3 to 8, preferably 3, and R$_1$ and R$_2$, which are identical or different, represent an alkyl radical with 1 to 10 carbon atoms, preferably an alkyl radical having 1 to 4 carbon atoms. Mention may be made, among these compounds, of hexamethylcyclotrisiloxane.

More preferably, the functionalized diene elastomer is a diene elastomer (especially an SBR) comprising, at one end of the main chain thereof, a silanol function or a polysiloxane group having a silanol end of formula —(SiR$_1$R$_2$—O—)mH with m representing an integer with a value equal to 3, preferably 3, R$_1$ and R$_2$, which are identical or different, represent an alkyl radical having 1 to 4 carbon atoms.

Preferentially, the functionalized diene elastomer (especially the SBRs) comprises a polar function which is an alkoxysilane bearing, or not bearing, another function (or bearing another chemical group, these expressions being synonymous).

Preferably, this functionalized diene elastomer comprises, within the main chain thereof, at least one alkoxysilane group bonded to the elastomer chain by the silicon atom, and optionally bearing at least one other function.

According to some variants, the alkoxysilane group (bearing or not bearing another function) is located at one end of the main chain of the elastomer (chain end).

According to other variants, the alkoxysilane group (bearing or not bearing another function) is located in the main elastomer chain (middle of the chain). The silicon atom of this function bonds the two branches of the main chain of the diene elastomer.

The alkoxysilane group (bearing or not bearing another function) comprises a C$_1$-C$_{10}$ alkoxyl radical, optionally partially or totally hydrolysed to give hydroxyl, or even a C$_1$-C$_8$, preferably C$_1$-C$_4$ alkoxyl radical, and is more preferentially methoxy and ethoxy.

The other function is preferably borne by the silicon of the alkoxysilane group, directly or via a spacer group, defined as being a saturated or unsaturated, cyclic or non-cyclic, divalent, linear or branched, aliphatic C$_1$-C$_{18}$ hydrocarbon-based radical or atom, or a divalent aromatic C$_6$-C$_{18}$ hydrocarbon-based radical.

The other function is preferably a function comprising at least one heteroatom chosen from N, S, O or P. Mention may be made, by way of example, among these functions, of cyclic or non-cyclic primary, secondary or tertiary amines, isocyanates, imines, cyanos, thiols, carboxylates, epoxides or primary, secondary or tertiary phosphines.

Mention may thus be made, as secondary or tertiary amine function, of amines substituted by C$_1$-C$_{10}$, preferably C$_1$-C$_4$, alkyl radicals, more preferentially a methyl or ethyl radical, or else cyclic amines forming a heterocycle containing a nitrogen atom and at least one carbon atom, preferably from 2 to 6 carbon atoms. For example, the methylamino-, dimethylamino-, ethylamino-, diethyl amino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable.

Mention may be made, as imine function, of the ketimines. For example, the (1,3-dimethylbutylidene)amino-, (ethylidene)amino-, (1-methylpropylidene)amino-, (4-N,N-dimethylaminobenzylidene)amino-, (cyclohexylidene)amino-, dihydroimidazole and imidazole groups are suitable.

Mention may thus be made, as carboxylate function, of acrylates or methacrylates. Such a function is preferably a methacrylate.

Mention may be made, as epoxide function, of the epoxy or glycidyloxy groups.

Mention may be made, as secondary or tertiary phosphine function, of phosphines substituted by C$_1$-C$_{10}$, preferably C$_1$-C$_4$, alkyl radicals, more preferentially a methyl or ethyl radical, or else diphenylphosphine. For example, the methylphosphino-, dimethylphosphino-, ethylphosphino-, diethylphosphino, ethylmethylphosphino- and diphenylphosphino-groups are suitable.

Preferentially, the other function is preferably a tertiary amine, more preferentially a diethylamino- or dimethylamino-group.

Preferentially, the functionalized diene elastomer (especially an SBR) may comprise a polar function which is an alkoxysilane bearing, or not bearing, an amine group.

Preferentially, the alkoxysilane bearing, or not bearing, an amine group is located at the chain end or in the middle of the chain of the main chain of the functionalized diene elastomer. More preferentially, the alkoxysilane group bearing, or not bearing, the amine group is located in the middle of the chain of the main chain of the functionalized diene elastomer.

Preferentially, the amine group is a tertiary amine.

Preferably, the alkoxysilane group may be represented by the formula (VI):

in which:
\*—represents the bond to an elastomer chain;
the radical R represents a substituted or unsubstituted C$_1$-C$_{10}$, or even C$_1$-C$_8$ alkyl radical, preferably a C$_1$-C$_4$ alkyl radical, more preferentially methyl and ethyl;
in the alkoxyl radical(s) of formula —OR', which is (are) optionally partially or totally hydrolysed to give hydroxyl, R' represents a substituted or unsubstituted C$_1$-C$_{10}$, or even C$_1$-C$_8$ alkyl radical, preferably a C$_1$-C$_4$ alkyl radical, more preferentially methyl and ethyl;
X represents a group including the other function;
a is 1 or 2, b is 1 or 2, and c is 0 or 1, with the proviso that a+b+c=3.

More preferentially, the functionalized diene elastomer is a diene elastomer (especially an SBR) that comprises, within the main chain thereof, at least one alkoxysilane group of formula (VI), in which:

* —represents the bond to an elastomer chain;
the radical R represents a substituted or unsubstituted $C_1$-$C_4$ alkyl radical, more preferentially methyl and ethyl;
in the alkoxyl radical(s) of formula —OR', which is (are) optionally partially or totally hydrolysed to give hydroxyl, R' represents a substituted or unsubstituted $C_1$-$C_4$ alkyl radical, more preferentially methyl and ethyl;
X represents a group including the other function; preferably a tertiary amine;
a is 1 or 2, b is 1 or 2, and c is 0 or 1, with the proviso that a+b+c=3.

This type of elastomer is mainly obtained by functionalization of a living elastomer resulting from an anionic polymerization. It should be specified that it is known to those skilled in the art that, when an elastomer is modified by reaction of a functionalization agent with the living elastomer resulting from a step of anionic polymerization, a mixture of modified entities of this elastomer is obtained, the composition of which depends on the modification reaction conditions and especially on the proportion of reactive sites of the functionalization agent relative to the number of living elastomer chains. This mixture comprises entities which are functionalized at the chain end, coupled, star-branched and/or non-functionalized.

According to a particularly preferred variant, the modified diene elastomer comprises, as predominant entity, the diene elastomer functionalized in the middle of the chain by an alkoxysilane group bonded to the two branches of the diene elastomer via the silicon atom. More particularly still, the diene elastomer functionalized in the middle of the chain by an alkoxysilane group represents 70% by weight of the modified diene elastomer.

These functionalized elastomers can be used as a blend (mixture) with one another or with non-functionalized elastomers.

The rubber compositions in accordance with the invention may contain just one diene elastomer, functionalized or not, or else a mixture of several diene elastomers, functionalized or not, it being possible for the diene elastomer(s) to be used in combination with any type of synthetic elastomer other than a diene elastomer, or even with polymers other than elastomers, for example thermoplastic polymers.

Reinforcing Inorganic Filler

The term "reinforcing inorganic filler" should be understood here to mean, in a known way, any inorganic or mineral filler, irrespective of its colour and its origin (natural or synthetic), also known as "white filler", "clear filler" or else "non-black filler", in contrast to carbon black, this inorganic filler being capable of reinforcing, by itself, without means other than an intermediate coupling agent, a rubber composition especially intended for the manufacture of semi-finished products for tyres or of tyres, in other words capable of replacing, in its reinforcing role, a conventional tyre-grade carbon black for rubber compositions, especially intended for the manufacture of semi-finished products for tyres or of tyres. Such a filler is generally characterized by the presence of functional groups, especially hydroxyl (—OH) functional groups, at its surface, requiring in that regard the use of a coupling agent or system intended to provide a stable chemical bond between the elastomer and said filler.

The reinforcing inorganic filler of use in the rubber compositions in accordance with the invention comprises at least one silica S having:
  a CTAB specific surface area $S_{CTAB}$ within a range extending from 40 to 300 m$^2$/g;
  a difference between the BET specific surface area $S_{BET}$ and the CTAB specific surface area $S_{CTAB}$ of greater than or equal to 35 m$^2$/g;
  an aluminium content $W_{Al}$ within a range extending from 0.5 to 7.0% by weight relative to the weight of the silica S;
  a width of the aggregate size distribution Ld, measured by centrifugal sedimentation, of greater than or equal to 1.5; and
  a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_{Al}] \quad (I)$$

in which:
  [d50] is the numerical value of d50, expressed in nm;
  [$S_{CTAB}$] is the numerical value of $S_{CTAB}$, expressed in m$^2$/g;
  [$W_{Al}$] is the numerical value of $W_{Al}$, expressed in % by weight
  relative to the weight of the silica S; and
said magnitude A satisfies the relationship (II):

$$A \geq 253 \quad (II).$$

Preferentially, the reinforcing inorganic filler of use in the rubber compositions in accordance with the invention comprises at least one silica S capable of being obtained by a preparation process, said process comprising the following steps:
(i) having available an initial solution having a pH within a range extending from 2.00 to 5.00;
(ii) adding to said initial solution, simultaneously, a silicate and an acid such that the pH of the reaction medium is maintained in a range extending from 2.00 to 5.00;
(iii) stopping the addition of the acid, while continuing the addition of the silicate into the reaction medium until a pH value for said reaction medium within a range extending from 7.00 to 10.00 is obtained;
(iv) adding to the reaction medium, simultaneously, at least one aluminium compound, a silicate and an acid such that the pH of the reaction medium is maintained in a range extending from 7.00 to 10.00;
(v) stopping the addition of the silicate and of said at least one aluminium compound, while continuing the addition of the acid into the reaction medium until a pH value for the reaction medium of less than 6.0 is obtained, and obtaining a suspension of precipitated silica S;
said silica S especially having a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_{Al}] \quad (I)$$

in which:
  [d50] is the numerical value of d50 measured, expressed in nm;
  [$S_{CTAB}$] is the numerical value of $S_{CTAB}$, expressed in m²/g;
  [$W_{Al}$] is the numerical value of $W_{Al}$, expressed in % by weight relative to the weight of the silica S; and
said magnitude A satisfies the relationship (II):

$$A \geq 253 \tag{II}$$

For the sake of conciseness in the remainder of the present application, the silicas having the characteristics defined above (including the preferred modes of said characteristics as defined below) and also the silicas obtained, or capable of being obtained, by the process defined above (including the preferred modes of said process as defined below) are referred to as "silica(s) S".

The CTAB specific surface area $S_{CTAB}$ is the external specific surface area as determined by measuring the amount of N-hexadecyl-N,N,N-trimethylammonium bromide adsorbed onto the surface of the silica at a given pH; this measurement being described above.

The CTAB specific surface area $S_{CTAB}$ of the silica S is greater than or equal to 40 m²/g, more preferentially greater than or equal to 60 m²/g. Preferentially, the $S_{CTAB}$ may be greater than or equal to 70 m²/g. More preferentially still, the $S_{CTAB}$ may be greater than or equal to 110 m²/g, greater than or equal to 120 m²/g, or even greater than or equal to 130. The $S_{CTAB}$ of the silica S is less than or equal to 300 m²/g, preferentially less than or equal to 280 m²/g, more preferentially still less than or equal to 270 m²/g.

Preferentially, the $S_{CTAB}$ of the silica S which has proved to be advantageous for the compositions in accordance with the invention may be within a range extending from 70 to 300 m²/g, from 80 to 300 m²/g, from 110 to 300 m²/g, from 120 to 300 m²/g; from 130 to 280 m²/g.

The difference between the BET and CTAB specific surface areas (denoted in the remainder of the description as $S_{BET}$-$S_{CTAB}$) is generally considered to be representative of the microporosity of a silica, in that it constitutes a measurement of the pores of the silica which are accessible to nitrogen molecules but not to larger molecules such as N hexadecyl-N,N,N-trimethylammonium bromide.

The silica S has an $S_{BET}$-$S_{CTAB}$ difference of greater than or equal to 35 m²/g. Preferably, the $S_{BET}$-$S_{CTAB}$ of the silica S is greater than or equal to 40 m²/g, more preferentially greater than or equal to 45 m²/g, more preferentially greater than or equal to 50 m²/g, more preferentially still greater than or equal to 55 m²/g, and even greater than or equal to 60 m²/g. The values of $S_{BET}$-$S_{CTAB}$ difference are not limited. In general, the $S_{BET}$-$S_{CTAB}$ difference of the silica S may be less than or equal to 150 m²/g, preferentially less than or equal to 100 m²/g. The $S_{BET}$-$S_{CTAB}$ especially does not exceed 300 m²/g.

Preferentially, the $S_{BET}$-$S_{CTAB}$ difference is within a range extending from 50 to 300 m²/g, more preferentially from 55 to 150 m²/g.

The BET specific surface area $S_{BET}$ of the silica S is not particularly limited but it is at least 35 m²/g greater than the value of the CTAB specific surface area $S_{CTAB}$. The $S_{BET}$ of the silica S is preferentially greater than or equal to 80 m²/g, preferably greater than or equal to 100 m²/g, preferably greater than or equal to 140 m²/g, preferably greater than or equal to 160 m²/g, preferably greater than or equal to 170 m²/g, more preferentially greater than or equal to 180 m²/g.

Preferably, the $S_{BET}$ is less than or equal to 450 m²/g, more preferentially less than or equal to 400 m²/g.

The silica S may have the following preferred combinations of specific surface areas: an $S_{CTAB}$ within a range extending from 70 to 300 m²/g and an $S_{BET}$ within a range extending from 110 to 450 m²/g; an $S_{CTAB}$ within a range extending from 110 to 300 m²/g and an $S_{BET}$ within a range extending from 160 to 450 m²/g; an $S_{CTAB}$ within a range extending from 110 to 300 m²/g and an $S_{BET}$ within a range extending from 180 to 450 m²/g; an $S_{CTAB}$ within a range extending from 120 to 300 m²/g and an $S_{BET}$ within a range extending from 200 to 450 m²/g.

The silica S comprises aluminium. The aluminium content ($W_{Al}$) of the silica S is within a range extending from 0.5 to 7.0% by weight, preferentially from 0.5 to 5.0% by weight. In the whole of the present document, the aluminium content $W_{Al}$ is defined as being the content of Al by weight relative to the weight of silica S. $W_{Al}$ is determined (measured) by inductively coupled plasma atomic emission spectroscopy (ICP-AES) as described above.

$W_{Al}$ is preferably greater than or equal to 0.8% by weight and preferentially greater than or equal to 1.0% by weight. More preferentially, $W_{Al}$ may be within a range extending from 0.8 to 3.5% by weight, and even from 1.0 to 3.0% by weight.

It must be appreciated that the silica S may contain other elements in addition to the aluminium; nonlimiting examples of other elements are, especially, Mg, Ca or Zn.

It has been observed that, in comparison to a precipitated silica having the same $S_{CTAB}$, the silica S has a higher aggregate size distribution and affords the rubber compositions containing same an improved compromise of rolling resistance/wear resistance performance properties.

The silica S has a width of the aggregate size distribution Ld, measured by centrifugal sedimentation, of greater than or equal to 1.5, preferentially greater than or equal to 1.6. Preferentially, the width of the aggregate size distribution Ld, measured by centrifugal sedimentation, may be less than or equal to 4, for example less than or equal to 3.5.

Preferentially, the width of the aggregate size distribution Ld of the silica S, measured by centrifugal sedimentation, is within a range extending from 1.5 to 3.5, preferentially from 1.5 to 3.2. Even more preferentially, the width of the aggregate size distribution Ld of the silica S, measured by centrifugal sedimentation, is within a range extending from 1.5 to 3.0, preferably from 1.5 to 2.5.

The silicas S have a high median aggregate diameter d50, measured by centrifugal sedimentation, for a given value of $S_{CTAB}$. It is known that the size of the silica aggregates and the surface area of the silica are inversely proportional to one another: the size of the aggregates decreases when the specific surface area, especially the $S_{CTAB}$, increases.

In particular, it has been observed that the silicas used in the rubber compositions according to the invention have a median aggregate diameter d50, measured by centrifugal sedimentation, that is significantly higher than the silicas of the prior art containing aluminium, for a given specific surface area $S_{CTAB}$ value and for a given aluminium content $W_{Al}$. This axiom is expressed by the magnitude A, which satisfies the following relationship (II): A≥253 (II); A being a unitless number and being defined by the equation (I):

$$A = [d50] + 0.782 \times [S_{CTAB}] - 8.524 \times [W_{Al}] \tag{I}$$

in which:
  [d50] is the numerical value of d50, expressed in nm;
  [$S_{CTAB}$] is the numerical value of $S_{CTAB}$, expressed in m²/g;

[W$_{Al}$] is the numerical value of W$_{Al}$, expressed in % by weight
relative to the weight of the silica S.

In the equation (I), [d50] is unitless. For example, if the measured value of d50, measured by centrifugal sedimentation, is 16 nm, then the numerical value of d50 is 16 and therefore [d50]=16.

In the equation (I), [S$_{CTAB}$] is unitless. For example, if the measured value of S$_{CTAB}$ is 200 m$^2$/g, then the numerical value of S$_{CTAB}$ is 200 and therefore [S$_{CTAB}$]=200.

In the equation (I), [W$_{Al}$] is unitless. For example, if the measured value of W$_{Al}$ is 1.3% by weight relative to the weight of the silica S, then the numerical value of W$_{Al}$ is 1.3; and therefore [W$_{Al}$]=1.3.

The magnitude A is a unitless number which, for the silica S, is greater than or equal to 253.

Preferentially, the magnitude A is less than or equal to 300. Preferred values for the magnitude A may be: A≥253, A≥255, A≥258, A≥259, A≥260.

Preferentially, the relationship (II) may be 253≤A≤298 (IIa).

Preferentially, the relationship (II) may be 255≤A≤297 (IIb).

Preferentially, the relationship (II) may be 255≤A≤288 (IIc).

Preferentially, the relationship (II) may be 258≤A≤285 (IId).

Preferentially, the relationship (II) may be 259≤A≤285 (IIe).

Preferentially, the relationship (II) may be 259≤A≤300 (IIf).

Preferentially, when the S$_{CTAB}$ is within the range extending from 40 to 300 m$^2$/g, the silica S has a median aggregate diameter d50, measured by centrifugal sedimentation, of greater than or equal to 30 nm.

Preferentially, when W$_{Al}$ is within the range extending from 0.8 to 3.0% by weight and the CTAB surface area is within a range extending from 70 to 280 m$^2$/g, typical values of the median aggregate diameter d50 are generally greater than or equal to 65 nm, even greater than or equal to 70 nm, and even greater than or equal to 80 nm.

Preferentially, d50 of the silica S is less than or equal to 320 nm, more preferentially is less than or equal to 300 nm.

In one advantageous embodiment, the reinforcing inorganic filler comprises a silica S having:
- an S$_{CTAB}$ within the range extending from 40 to 300 m$^2$/g;
- an S$_{BET}$–S$_{CTAB}$ difference of greater than or equal to 35 m$^2$/g;
- an aluminium content (W$_{Al}$) within the range extending from 0.5 to 5.0% by weight;
- a width of the aggregate size distribution Ld, measured by centrifugal sedimentation, of greater than or equal to 1.5; and
- a median aggregate diameter d50, measured by centrifugal sedimentation, such that for a given value of CTAB specific surface area S$_{CTAB}$ and a given aluminium content W$_{Al}$, a magnitude A is defined by the following equation (I):

$$A=[d50]+0.782\times[S_{CTAB}]-8.524\times[W_{Al}] \qquad (I)$$

in which:
[d50] is the numerical value of d50, expressed in nm;
[S$_{CTAB}$] is the numerical value of S$_{CTAB}$, expressed in m$^2$/g;
[W$_{Al}$] is the numerical value of W$_{Al}$, expressed in % by weight relative to the weight of the silica S; and said magnitude A satisfies the relationship (II):

$$A \geq 255 \qquad (II).$$

In another advantageous embodiment, the reinforcing inorganic filler comprises a silica S having:
- an S$_{CTAB}$ within the range extending from 70 to 300 m$^2$/g;
- an S$_{BET}$–S$_{CTAB}$ difference of greater than or equal to 50 m$^2$/g;
- an aluminium content (W$_{Al}$) within the range extending from 0.5 to 5.0% by weight;
- a width of the aggregate size distribution Ld, measured by centrifugal sedimentation, within the range extending from 1.5 to 3.5; and
- a median aggregate diameter d50, measured by centrifugal sedimentation, such that for a given value of CTAB specific surface area S$_{CTAB}$ and a given aluminium content W$_{Al}$, a magnitude A is defined by the following equation (I):

$$A=[d50]+0.782\times[S_{CTAB}]-8.524\times[W_{Al}] \qquad (I)$$

in which:
[d50] is the numerical value of d50, expressed in nm;
[S$_{CTAB}$] is the numerical value of S$_{CTAB}$, expressed in m$^2$/g;
[W$_{Al}$] is the numerical value of W$_{Al}$, expressed in % by weight
relative to the weight of the silica S; and
said magnitude A satisfies the relationship (II):

$$A \geq 255 \qquad (II).$$

In another advantageous embodiment, the reinforcing inorganic filler comprises a silica S having:
- an S$_{CTAB}$ within the range extending from 110 to 300 m$^2$/g;
- an S$_{BET}$–S$_{CTAB}$ difference of greater than or equal to 50 m$^2$/g;
- an aluminium content (W$_{Al}$) within the range extending from 0.8 to 5.0% by weight;
- a width of the aggregate size distribution Ld, measured by centrifugal sedimentation, within the range extending from 1.5 to 3.5; and
- a median aggregate diameter d50, measured by centrifugal sedimentation, such that for a given value of CTAB specific surface area S$_{CTAB}$ and a given aluminium content W$_{Al}$, a magnitude A is defined by the following equation (I):

$$A=[d50]+0.782\times[S_{CTAB}]-8.524\times[W_{Al}] \qquad (I)$$

in which:
[d50] is the numerical value of d50, expressed in nm;
[S$_{CTAB}$] is the numerical value of S$_{CTAB}$, expressed in m$^2$/g;
[W$_{Al}$] is the numerical value of W$_{Al}$, expressed in % by weight
relative to the weight of the silica S; and
said magnitude A satisfies the relationship (II):

$$259 \leq A \leq 300 \qquad (IIf).$$

In an additional advantageous embodiment, the reinforcing inorganic filler comprises a silica S having:
- an S$_{CTAB}$ within a range extending from 110 to 300 m$^2$/g;
- an S$_{BET}$–S$_{CTAB}$ difference of greater than or equal to 50 m$^2$/g;
- an aluminium content (W$_{Al}$) within a range extending from 0.8 to 3.0% by weight;

a width of the aggregate size distribution Ld, measured by centrifugal sedimentation, within a range extending from 1.5 to 2.5; and a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_{Al}] \quad (I)$$

in which:
[d50] is the numerical value of d50, expressed in nm;
[$S_{CTAB}$] is the numerical value of $S_{CTAB}$, expressed in $m^2/g$;
[$W_{Al}$] is the numerical value of $W_{Al}$, expressed in % by weight relative to the weight of the silica S; and
said magnitude A satisfies the relationship (II):

$$259 \leq A \leq 300 \quad (IIf).$$

In an additional advantageous embodiment, the reinforcing inorganic filler comprises a silica S having:
an $S_{CTAB}$ within the range extending from 110 to 300 $m^2/g$;
an $S_{BET}$ within a range extending from 180 $m^2/g$ to 450 $m^2/g$;
an $S_{BET}-S_{CTAB}$ of greater than or equal to 50 $m^2/g$;
an aluminium content ($W_{Al}$) within the range extending from 0.8 to 3.0% by weight;
a width of the aggregate size distribution Ld, measured by centrifugal sedimentation, within a range extending from 1.5 to 2.5; and
a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_A] \quad (I)$$

in which:
[d50] is the numerical value of d50, expressed in nm;
[$S_{CTAB}$] is the numerical value of $S_{CTAB}$, expressed in $m^2/g$;
[$W_{Al}$] is the numerical value of $W_{Al}$, expressed in % by weight relative to the weight of the silica S; and
said magnitude A satisfies the relationship (II):

$$A \geq 253 \quad (II).$$

These silicas S are preferably obtained, or capable of being obtained, by a process for preparing precipitated silica as described below, including all the preferred modes and variants of said process. The silica S is a precipitated silica.

The process for preparing the precipitated silica S comprises the following steps:
(i) having available an initial solution having a pH within a range extending from 2.00 to 5.00;
(ii) adding to said initial solution, simultaneously, a silicate and an acid such that the pH of the reaction medium is maintained in a range extending from 2.00 to 5.00;
(iii) stopping the addition of the acid, while continuing the addition of the silicate into the reaction medium until a pH value for said reaction medium within a range extending from 7.00 to 10.00 is obtained;
(iv) adding to the reaction medium, simultaneously, at least one aluminium compound, a silicate and an acid such that the pH of the reaction medium is maintained in a range extending from 7.00 to 10.00;
(v) stopping the addition of the silicate and of said at least one aluminium compound, while continuing the addition of the acid into the reaction medium until a pH value for the reaction medium of less than 6.0 is obtained, and obtaining a suspension of precipitated silica S.

In the present description, the term "silicate" is used to denote one or more silicate(s) which may be added during said process. The silicate may be selected from the group consisting of alkali metal silicates.

Preferentially, the silicate is selected from the group consisting of sodium silicate and potassium silicate. The silicate may be in any known form, such as metasilicate or disilicate.

In the case in which sodium silicate is used, the latter generally has an $SiO_2/Na_2O$ weight ratio within a range extending from 2.0 to 4.0, in particular from 2.4 to 3.9, for example from 3.1 to 3.8.

The silicate may have a concentration (expressed as % by weight relative to $SiO_2$) within a range extending from 3.9% to 25.0% by weight, for example from 5.6% to 23.0% by weight, in particular from 5.6% to 20.7%.

In the present description, the term "acid" is used to denote one or more acid(s) which may be added during said process. The process may be carried out with any type of acid known to those skilled in the art. As acid, use is generally made of an inorganic acid, such as sulfuric acid, nitric acid or hydrochloric acid, or of an organic acid, such as acetic acid, formic acid or carbonic acid. Preferentially, the acid is selected from the group consisting of sulfuric acid, nitric acid or hydrochloric acid; more preferentially, the acid is sulfuric acid.

The acid added precisely into the reaction medium may be in diluted or concentrated form. The same acid may be used at different steps of the process, at identical or different concentrations in the different steps. Preferentially, the acid is sulfuric acid.

In a preferred embodiment of the process, for all the steps of the process the acid is sulfuric acid and the silicate is sodium silicate. Preferentially, the same sodium silicate having the same concentration (expressed as % by weight relative to $SiO_2$) is used in all the steps of the process.

In the step (i) of the process, an initial solution having a pH within a range extending from 2.00 to 5.00 is made available, and introduced into the reactor. The initial solution is an aqueous solution. The term "aqueous" indicates that the solvent is water.

Preferably, the initial solution has a pH within a range extending from 2.50 to 5.00, in particular from 3.00 to 4.50; for example from 3.50 to 4.50.

The initial solution may be obtained by adding acid to water so as to obtain an initial aqueous solution pH value within a range extending from 2.50 to 5.00, in particular from 3.00 to 4.50; for example from 3.50 to 4.50.

Alternatively, the initial solution may contain a silicate. It may therefore also be obtained by adding acid to a mixture of water and silicate so as to obtain a pH within a range extending from 2.00 to 5.00, in particular from 3.00 to 4.50; for example from 3.50 to 4.50.

The initial solution may also be prepared by adding acid to a solution containing silica particles formed beforehand at a pH of less than 7.00, so as to obtain a pH value within a range extending from 2.00 to 5.00, preferably from 2.50 to 5.00, in particular from 3.00 to 4.50, for example from 3.50 to 4.50.

The initial solution of step (i) may or may not comprise an electrolyte. Preferably, the initial aqueous solution of step (i) comprises an electrolyte which does not contain aluminium.

The term "electrolyte" is understood here in its usual accepted meaning, that is to say that it means any ionic or molecular substance which, when it is in solution, decomposes or dissociates to form ions or charged particles. The term "electrolyte" is used in the present description to indicate one or more electrolyte(s) which may be present. Mention may be made, as electrolyte of use in the initial aqueous solution, of salts selected from the group consisting of alkali metal salts and alkaline earth metal salts. Preferentially, the electrolyte of use in the initial aqueous solution is a metal salt of the initial silicate and of the acid which are used in the process. Notable examples of these salts are especially sodium chloride in the case of the reaction of a sodium silicate with hydrochloric acid or sodium sulfate in the case of the reaction of a sodium silicate with sulfuric acid. Preferably, the electrolyte is sodium sulfate.

Preferably, when sodium sulfate is used as electrolyte in step (i), its concentration in the initial aqueous solution is within a range extending from 8 to 40 g/l, in particular from 10 to 35 g/l, for example from 13 to 30 g/l.

The step (ii) of the process comprises simultaneous addition of an acid and of a silicate to the initial solution. The amounts of acid and of silicate added during step (ii) are regulated such that the pH of the reaction medium is maintained in a range extending from 2.00 to 5.00, more preferentially is maintained in a range extending from 2.50 to 5.00, in particular maintained from 3.00 to 5.00, for example maintained in a range extending from 3.20 to 4.80.

This simultaneous addition in step (ii) is advantageously carried out such that the pH value of the reaction medium is constantly equal to the pH reached at the end of step (i), ±0.20 pH unit.

Preferably, step (ii) consists of simultaneous addition of acid and of silicate to the initial solution, as described in detail below.

In one embodiment of the process, an intermediate step (ii') may be carried out between step (i) and step (ii), in which a silicate and an acid are added to the initial solution such that the pH of the reaction medium is maintained in a range extending from 2.00 to 9.50. The addition of silicate and of acid may be simultaneous for all or just for part of step (ii'). The step (ii') is typically prolonged for 1 to 10 minutes, preferably for 2 to 8 minutes, before step (ii) is started.

Then, in step (iii), the addition of the acid is stopped while continuing the addition of the silicate into the reaction medium. The addition of acid is stopped when the pH of the reaction medium is within a range extending from 7.00 to 10.00, preferably from 7.50 to 9.50.

At the end of step (iii), that is to say after stopping the addition of silicate, it may be advantageous to carry out a step of maturation of the reaction medium. This step of maturation of the reaction medium is preferably carried out at the pH obtained at the end of step (iii). The step of maturation may be carried out under stirring of the reaction medium. The step of maturation is preferably carried out under stirring of the reaction medium for a duration of 2 to 45 minutes, in particular of 5 to 25 minutes. Preferably, the step of maturation does not comprise any addition of acid or of silicate.

After step (iii) and the optional step of maturation, the simultaneous addition of at least one aluminium compound, an acid, and a silicate is carried out, such that the pH of the reaction medium is maintained in a range extending from 7.00 to 10.00, preferably from 7.50 to 9.50.

This simultaneous addition of at least one aluminium compound, an acid and a silicate (step (iv)) is preferably carried out such that the pH value of the reaction medium is constantly equal to the pH reached at the end of the preceding step, step (iii), ±0.20 pH unit.

It should be noted that said process may comprise additional steps. For example, between step (iii) and step (iv), on the one hand, and between the optional step of maturation following step (iii) and step (iv), on the other, an acid may be added to the reaction medium. After this addition of acid, the pH of the reaction medium must remain within a range extending from 7.00 to 9.50, preferably from 7.50 to 9.50.

In step (v), the addition of the silicate and of said at least one aluminium compound is stopped, while continuing the addition of acid into the reaction medium, so as to obtain a pH value in the reaction medium of less than 6.00, preferably within a range extending from 3.00 to 5.50, in particular from 3.00 to 5.00. A suspension of precipitated silica is obtained in the reactor.

At the end of step (v) and consequently after stopping the addition of acid into the reaction medium, a step of maturation may advantageously be carried out. This step of maturation of the reaction medium is preferably carried out at the pH obtained at the end of step (iv). The step of maturation may be carried out under stirring of the reaction medium. The step of maturation is preferably carried out under stirring of the reaction medium for a duration of 2 to 45 minutes, in particular of 5 to 25 minutes. Preferably, the step of maturation does not comprise any addition of acid or of silicate.

At least one aluminium compound is added precisely into the reaction medium during step (iv), that is to say during the simultaneous addition of an acid and of a silicate into the reaction medium at a pH within a range extending from 7.00 to 10.00. Said at least one aluminium compound may be added precisely into the reaction medium over the course of the total duration of step (iv), that is to say at the same time as the addition of acid and of silicate. As a variant, it may be added precisely during only part of step (iv), for example only after a first simultaneous addition of acid and of silicate has been carried out.

The expression "at least one aluminium compound" is used to denote one or more aluminium compounds which may be added over the course of said process.

Any known aluminium compound may be of use in said process, with the proviso that it is water-soluble. Notable examples of suitable aluminium compounds may be, without this being limiting, aluminium chlorides, sulfates or nitrites, or alkali metal aluminates. Preferentially, the aluminium compound is selected from the group consisting of alkali metal aluminates. Preferably, the aluminium compound is selected from the group consisting of potassium aluminate and sodium aluminate. More preferentially still, the aluminium compound is sodium aluminate.

The reactor in which the whole of the reaction of the silicate with the acid is carried out is customarily provided with adequate stirring apparatus and heating apparatus.

The whole of the reaction of the silicate with the acid (steps (i) to (v)) is generally carried out at a temperature within a range extending from 40 to 97° C., in particular from 60 to 95° C., preferably from 80 to 95° C., more preferentially from 85 to 95° C.

According to a variant of the invention, the whole of the reaction of the silicate with the acid is carried out at a constant temperature, preferentially within a range extending from 40 to 97° C., in particular from 80 to 95° C., more preferentially from 85 to 95° C.

According to another variant of the invention, the reaction end temperature is higher than the reaction start temperature: thus, the temperature is maintained at the start of the reaction (for example over the course of steps (i) to (iii)) preferably within a range extending from 40 to 85° C., then the temperature is increased, preferably up to a value within a range extending from 80 to 95° C., preferably from 85 to 95° C., at which value it is maintained (for example over the course of steps (iv) and (v)) until the end of the reaction.

It has been found that the succession of these specific steps, in particular the presence of a first simultaneous addition of acid and of silicate at a pH within a range extending from 2.00 to 5.00 and of the simultaneous addition of an aluminium compound, of acid and of silicate at a pH within a range extending from 7.00 to 10.00 constitutes important conditions for obtaining a precipitated silica having the claimed characteristics and in particular high aggregate size distribution and median aggregate diameter d50. The different parameters of the process, such as, for example, the temperature, the pH of the reaction medium, the amount of electrolyte in step (i) and the amount of aluminium compound may be modified in order to obtain precipitated silicas having the required values of CTAB specific surface area $S_{CTAB}$, BET specific surface area $S_{BET}$ and aluminium content $W_{Al}$.

At the end of the steps which have just been described, a silica slurry is obtained, which is then separated (liquid-solid separation). Preferentially, the process for preparing the silica also comprises a step (vi) in which said suspension is filtered and the precipitated silica is dried.

The separation carried out in said preparation process customarily comprises a filtration followed by washing, if necessary. The filtration is carried out according to any known method, for example by means of a filter press, belt filter, vacuum filter or rotary filter, preferably by means of a filter press. At the end of this step, a filter cake is obtained.

The filter cake is then subjected to a crumbling operation. The term "crumbling" in the present case is intended to denote a process in which a solid, namely the filter cake, is converted into a fluid. After the crumbling step (also referred to as fluidization or liquefaction operation), the filter cake is in a flowable form of fluid type, and the precipitated silica is in suspension again.

In one variant, the crumbling step may comprise a mechanical treatment which causes a reduction in the particle size of the silica in suspension. Said mechanical treatment may be carried out by passing the filter cake through a high shear mixer, such as a mill of colloidal type or a ball mill. In another variant, the crumbling step may comprise a chemical treatment. The filter cake is then subjected to chemical action by the addition, for example, of an acid or of an aluminium compound, different or identical to that used in step (iv) of the process. The aluminium compound used in the crumbling step is preferably identical to that used in step (iv) of the process and is for example sodium aluminate or potassium aluminate, even more preferably sodium aluminate. In yet another variant, the crumbling step may comprise both a mechanical treatment and a chemical treatment.

When an aluminium compound is added to the filter cake during the crumbling operation, the amount is generally such that the weight ratio of the aluminium compound to the amount of silica, expressed as $SiO_2$, present in the filter cake is within a range extending from 0.10% to 0.75%, preferably from 0.10% to 0.50% by weight, more preferably from 0.20% to 0.45% by weight.

Independently of the stage at which an aluminium compound is added, the cumulative amount of said aluminium compound added precisely into the reaction medium and during the chemical crumbling step is such that the aluminium content in the precipitated silica S is within a range extending from 0.5 to 7.0% by weight relative to the weight of the silica, preferably from 0.8 to 3.5% by weight, and even from 1.0 to 3.0% by weight relative to the weight of the silica. The contents of aluminium compound added during the chemical crumbling step may be adapted to obtain the desired aluminium content in the precipitated silica S by means known to those skilled in the art.

Preferably, the suspension of precipitated silica S which is obtained after the crumbling step is then dried.

This drying may be carried out by any means known per se.

Preferably, the drying is carried out by atomization. To this end, any type of suitable atomizer may be used, especially a rotary, nozzle, liquid pressure or two-fluid atomizer. Generally, when the filtration is carried out using a filter press, a nozzle atomizer is used and, when the filtration is carried out using a vacuum filter, a rotary atomizer is used.

When the drying is carried out using a nozzle atomizer, the silica S capable of then being obtained is customarily in the form of substantially spherical beads. At the end of this type of drying, a step of milling or micronizing the product recovered may then be carried out. The silica S which is then capable of being obtained is generally in the form of a powder.

When the drying is carried out using a rotary atomizer, the silica S capable of then being obtained may be in the form of a powder.

Finally, the product dried (especially by a rotary atomizer) or milled or micronized as indicated above may optionally be subjected to a step of agglomeration, which consists for example of direct compression, wet granulation (that is to say using a binder such as water, silica suspension, etc.), extrusion, or, preferably, dry compacting. The silica S capable of then being obtained by this agglomeration step is generally in the form of granules.

Preferentially, the silica S may optionally be combined with at least one additional silica in the rubber compositions in accordance with the invention. In other words, the reinforcing inorganic filler also comprises an additional silica different from the silica S.

In such a case, the content of each of these silicas may be within a range extending from 1 to 99% by weight relative to the total weight of the reinforcing inorganic filler. Preferably, it is advantageous for the silica S to represent at least 50% by weight of the total weight of the reinforcing inorganic filler, more preferentially at least 80% by weight of the total weight of the reinforcing inorganic filler. The total weight of the reinforcing inorganic filler corresponds to the sum of the weight of the silica S and of the weight of the additional silica.

"Additional silica" is intended to mean any other silica different from the silicas S, that is to say having characteristics different from the silicas S, especially having a magnitude A that does not satisfy the relationship (II). As additional silicas, mention may be made of precipitated or fumed silicas different from the silicas S. What are referred to as highly dispersible silicas ("HDSs") may especially be used, such as, for example, the Ultrasil 7000GR silicas from Evonik, the Zeosil® 1165 MP and Zeosil® 1115 MP silicas from Solvay, the Zeosil® Premium 200MP silica from Solvay, the Hi-Sil EZ150G silica from PPG, the Zeopol 8715, 8745 or 8755 silicas from Huber, or the silicas as described in applications WO03/016215 and WO03/016387.

In another embodiment, the reinforcing inorganic filler may be a mixture of silica S and of another reinforcing inorganic filler selected from the group consisting of aluminium oxides, aluminium hydroxides, aluminosilicates, titanium oxides, silicon nitrides or carbides, all of reinforcing type. Such reinforcing inorganic fillers are for example described in applications WO99/28376, WO00/73372, WO02/053634, WO2004/003067, WO2004/056915.

As aluminium oxide, use may especially be made of a reinforcing and highly dispersible alumina having a BET surface area ranging from 30 to 400 $m^2/g$, more preferentially between 60 and 250 $m^2/g$, and a mean aggregate size at most equal to 500 nm, more preferentially at most equal to 200 nm. Mention may especially be made, as non-limiting examples of such reinforcing aluminas, of the Baikalox A125 or CR125 alumina (Baïkowski), APA-100RDX alumina (Condea), Aluminoxid C alumina (Degussa) or AKP-G015 alumina (Sumitomo Chemicals), and those described in application EP0810258.

As equivalent to an additional reinforcing inorganic filler, those skilled in the art will understand that they may especially use a reinforcing filler of organic type, especially a carbon black as described below, at least partially covered with an inorganic layer, especially a layer of silica. Such carbon blacks are described for example in document WO2013/190063.

Preferentially, the silica S represents 100% by weight of the total weight of the reinforcing inorganic filler.

The amount of reinforcing inorganic filler in the rubber composition of the invention depends on the use of this composition. Indeed, the expected level of reinforcement for a bicycle tyre, for example, is, as is known, significantly lower than that required for a tyre capable of running at high speed in a sustained manner, for example a motorcycle tyre, a tyre for a passenger vehicle or a tyre for a utility vehicle, such as a heavy-duty vehicle. Those skilled in the art know how to adapt the amount of the reinforcing inorganic filler depending on the use of the composition of the invention.

Preferably, the amount of reinforcing inorganic filler in the composition may be within a range extending preferably from 10 to 200 phr, more preferentially still within a range extending from 30 to 150 phr.

Agent for Coupling the Elastomer to the Reinforcing Inorganic Filler

The rubber compositions in accordance with the invention comprise at least one agent for coupling the elastomer to the reinforcing inorganic filler.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its aggregates) and the diene elastomer. The coupling agent has, for example, the simplified general formula "Y-T-X", in which:
- Y represents a functional group ("Y" function) which is capable of bonding physically and/or chemically to the inorganic filler, it being possible for such a bond to be established, for example, between a silicon atom of the coupling agent and the surface hydroxyl (OH) groups of the inorganic filler;
- X represents a functional group ("X" function) which is capable of bonding physically and/or chemically to the elastomer, for example via a sulfur atom;
- T represents a group which makes it possible to connect Y and X.

This connection may be established, for example, via covalent, hydrogen, ionic and/or electrostatic bonds between the Y function and the reinforcing inorganic filler and between the Z function and the elastomer.

The coupling agents should in particular not be confused with simple agents for covering the filler in question which, in a known way, may comprise the Y function, active with regard to the filler, but are devoid of the X function, active with regard to the elastomer.

Such coupling agents have been described in a very large number of documents and are well known to those skilled in the art. In fact, any coupling agent capable of effectively providing the bond or coupling between a reinforcing inorganic filler and the elastomer may be used.

Preferably, the agent for coupling the elastomer to the reinforcing inorganic filler is an organosilane compound.

Preferentially, the organosilane compound is selected from the group consisting of organosilane polysulfides (symmetrical or asymmetrical), polyorganosiloxanes, mercaptosilanes, masked mercaptosilanes, mercaptosilane dimers, masked mercaptosilane dimers, silane dimers having a mercaptosilane unit, mercaptosilane oligomers, masked mercaptosilane oligomers and silane oligomers having at least one mercaptosilane unit and at least one masked mercaptosilane, preferably organosilane polysulfides.

These agents for coupling the elastomer to the reinforcing inorganic filler, especially, have been described in a large number of documents, the best known being bifunctional alkoxysilanes such as alkoxysilane sulfides. Use is made in particular of alkoxysilane sulfides, referred to as "symmetrical" or "asymmetrical" depending on their specific structure, such as described, for example, in patent applications or patents U.S. Pat. Nos. 3,842,111, 3,873,489, 3,978,103, 3,997,581, 4,002,594, 4,072,701, 4,129,585, or in more recent documents U.S. Pat. Nos. 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085 and WO 02/083782.

More preferentially, the organosilane compound is selected from the organosilane polysulfides (symmetrical or asymmetrical), also referred to as silane polysulfides.

More particularly, use may be made of silane polysulfides, referred to as "symmetrical" or "asymmetrical" depending on their specific structure, such as described, for example, in applications WO 03/002648 (or US 2005/016651) and WO 03/002649 (or US 2005/016650).

Preferentially, suitable in particular, without the definition below being limiting, are silane polysulfides corresponding to the following general formula (VII):

$$Z\text{-}A\text{-}S_x\text{-}A\text{-}Z \tag{VII},$$

in which:
- x is an integer from 2 to 8 (preferably from 2 to 5);
- the A symbols, which are identical or different, represent a divalent hydrocarbon-based radical (preferably a $C_1$-$C_{18}$ alkylene group or a $C_6$-$C_{12}$ arylene group, more particularly a $C_1$-$C_{10}$, especially $C_1$-$C_4$, alkylene, in particular propylene);

the Z symbols, which are identical or different, correspond to one of the three formulae (VII) below:

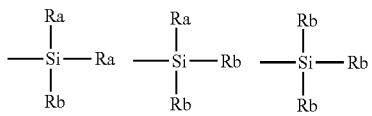

in which:
  the $R_a$ radicals, which are substituted or unsubstituted and identical to or different from one another, represent a $C_1$-$C_{18}$ alkyl group, $C_5$-$C_{18}$ cycloalkyl group or $C_6$-$C_{18}$ aryl group (preferably $C_1$-$C_6$ alkyl groups, cyclohexyl or phenyl, especially $C_1$-$C_4$ alkyl groups, more particularly methyl and/or ethyl).
  the $R_b$ radicals, which are substituted or unsubstituted and identical to or different from one another, represent a $C_1$-$C_{18}$ alkoxyl group or $C_5$-$C_{18}$ cycloalkoxyl group (preferably a group selected from $C_1$-$C_8$ alkoxyls and $C_5$-$C_8$ cycloalkoxyls, more preferentially still a group selected from $C_1$-$C_4$ alkoxyls, in particular methoxyl and ethoxyl).

In the case of a mixture of alkoxysilane polysulfides corresponding to the above formula (VII), especially normal commercially available mixtures, the mean value of the "x" indices is a fractional number preferably of between 2 and 5, more preferably of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl)) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. Mention will also be made, as preferential examples, of bis(mono($C_1$-$C_4$)alkoxyldi($C_1$-$C_4$)alkylsilylpropyl) polysulfides (especially disulfides, trisulfides or tetrasulfides), more particularly bis(monoethoxydimethylsilylpropyl) tetrasulfide, such as described in the aforementioned patent application WO 02/083782 (or U.S. Pat. No. 7,217,751).

Use may especially be made, as examples of coupling agents other than an alkoxysilane polysulfide, of bifunctional POSs (polyorganosiloxanes), or else of hydroxysilane polysulfides ($R_b$=OH in the above formula VII), such as described, for example, in patent applications WO 02/30939 (or U.S. Pat. No. 6,774,255), WO 02/31041 (or US 2004/051210) and WO2007/061550, or else of silanes or POSs bearing azodicarbonyl functional groups, such as described, for example, in patent applications WO 2006/125532, WO 2006/125533 and WO 2006/125534.

As examples of other silane sulfides, mention will be made, for example, of silanes bearing at least one thiol (—SH) function (referred to as mercaptosilanes) and/or at least one masked thiol function, the dimers or oligomers of these silanes, such as described, for example, in patents or patent applications U.S. Pat. No. 6,849,754, WO99/09036, WO2006/023815, WO2007/098080, WO2007/98120, EP1994038, EP2079793, WO2010/072685 and WO2008/055986.

The content of agent for coupling the elastomer to the reinforcing inorganic filler is easily adjusted by those skilled in the art depending on the content of reinforcing inorganic filler used in the composition.

More particularly, the content of coupling agent is advantageously less than 20 phr, it being understood that it is generally desirable to use as little as possible thereof. Typically, the content of coupling agent represents from 0.5% to 15% by weight relative to the weight of the reinforcing inorganic filler. Its content is preferentially between 0.5 and 12 phr, more preferentially within a range extending from 3 to 10 phr.

The Covering Agents

The rubber compositions in accordance with the invention may also contain coupling activators when a coupling agent is used, agents for covering the inorganic filler, or more generally processing aids capable, in a known manner, owing to an improvement in the dispersion of the filler in the rubber matrix and to a lowering of the viscosity of the compositions, of improving their processability in the uncured state. These covering agents are well known (see, for example, patent applications WO 2006/125533, WO 2007/017060 and WO 2007/003408); mention will be made, for example, of hydroxysilanes or hydrolysable silanes such as hydroxysilanes (see, for example, WO 2009/062733), alkylalkoxysilanes, especially alkyltriethoxysilanes such as, for example, 1-octyltriethoxysilane, polyols (for example diols or triols), polyethers (for example polyethylene glycols), primary, secondary or tertiary amines (for example trialkanolamines), hydroxylated or hydrolysable polyorganosiloxanes (for example α,ω-dihydroxypolyorganosilanes (especially α,ω-dihydroxypolydimethylsiloxanes) (see, for example, EP 0 784 072), and fatty acids such as, for example, stearic acid.

Reinforcing Organic Filler

The rubber compositions in accordance with the invention may also comprise at least one reinforcing organic filler such as, for example, carbon black or a reinforcing filler of polymer type. Preferentially, the reinforcing organic filler is carbon black.

All carbon blacks, especially blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an elastomer, especially an isoprene elastomer, in the form of a masterbatch (see, for example, applications WO 97/36724 or WO 99/16600).

Mention may be made, as examples of polymeric organic fillers, of functionalized polyvinyl organic fillers, such as described in applications WO 2006/069792, WO 2006/069793, WO 2008/003434 and WO 2008/003435.

When an organic filler is combined with the reinforcing inorganic filler, the organic filler is used in a low proportion, that is to say that the reinforcing inorganic filler remains the predominant filler.

Preferentially, the fraction by weight of the reinforcing organic filler is less than 50% relative to the total weight of the reinforcing filler (total weight of the reinforcing filler=weight of the reinforcing inorganic filler+weight of the reinforcing organic filler), preferably less than or equal to 20% relative to the total weight of the reinforcing filler.

More particularly, the content of the reinforcing organic filler, especially the content of carbon black, is within a range extending from 2 to 20 phr, more preferentially within a range extending from 5 to 15 phr.

Other Additives

The rubber compositions in accordance with the invention may optionally also comprise all or a portion of the usual additives customarily used in elastomer compositions intended for the manufacture of tyres or semi-finished articles for tyres, such as, for example, pigments, protection agents, such as anti-ozone waxes, chemical anti-ozonants or antioxidants, anti-fatigue agents, crosslinking agents other than those mentioned above, reinforcing resins or plasticizing agents, methylene acceptors (for example, phenolic novolak resin) or methylene donors (for example, HMT or H3M), such as described, for example, in application WO 02/10269. Preferably, when the rubber composition of the invention comprises a plasticizing agent, it is selected from the group consisting of solid hydrocarbon-based resins (or plasticizing resins), extending oils (plasticizing oils) or a mixture of plasticizing oils and resins.

Crosslinking System

The rubber compositions in accordance with the invention comprise a chemical crosslinking system. Any type of crosslinking system known to those skilled in the art for rubber compositions may be used.

The crosslinking system is preferably a vulcanization system, that is to say a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

When sulfur is used, it is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

The vulcanization system of the composition in accordance with the invention may also comprise one or more additional accelerators, for example compounds of the family of the thiurams, zinc dithiocarbamate derivatives, sulfenamides, guanidines or thiophosphates. Use may in particular be made of any compound capable of acting as accelerator of the vulcanization of diene elastomers in the presence of sulfur, especially accelerators of thiazoles type and also their derivatives, accelerators of the thiurams type, and zinc dithiocarbamates. These accelerators are, for example, selected from the group consisting of 2-mercaptobenzothiazole disulfide (abbreviated to MBTS), tetrabenzylthiuram disulfide (TBZTD), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBS), zinc dibenzyldithiocarbamate (ZBEC) and the mixtures of these compounds. Preferably, use is made of a primary accelerator of the sulfenamide type.

Process for Preparing the Compositions According to the Invention

The rubber compositions of the invention, intended especially for the manufacture of tyres or of semi-finished products for tyres, may be produced by any process well known to those skilled in the art.

For example, these rubber compositions in accordance with the invention may be produced in appropriate mixers, using two successive phases of preparation according to a general procedure well known to those skilled in the art: a first phase of thermomechanical working or kneading (sometimes referred to as a "non-productive" phase) at high temperature, up to a maximum temperature (denoted $T_{max}$) of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated; such phases have been described, for example, in applications EP-A-0501227, EP-A-0735088 and EP-A-0810258.

For example, in a process for preparing the compositions of the invention, the silica S, combined or not combined with another reinforcing inorganic filler, such as an additional silica for example, or with a carbon black and the agent for coupling the elastomer to said reinforcing inorganic filler, are incorporated by kneading to the elastomer or elastomers during the first "non-productive" phase, that is to say that at least these ingredients are introduced into the mixer and thermomechanically kneaded, in one or several goes. Then, after for example one to two minutes of kneading, the optional additional covering agents or processing aids and other various additives, with the exception of the crosslinking or vulcanization system, are added to the internal mixer. This mixture is thermomechanically kneaded until the abovementioned maximum temperature $T_{max}$ is reached. It is possible to envisage one or more additional steps with the aim of preparing masterbatches of elastomers/reinforcing inorganic fillers intended to be introduced during the first "non-productive" phase. The masterbatches of elastomers/reinforcing inorganic fillers comprising at least one silica S may be obtained by bulk mixing or liquid mixing starting from an elastomer latex and an aqueous dispersion of said reinforcing inorganic filler.

The mixture is then cooled and the crosslinking system (preferably the vulcanization system) is then incorporated at low temperature (typically less than 100° C.), generally in an external mixer, such as an open mill; the combined mixture is then mixed for a few minutes, for example between 5 and 15 min. This second phase is the "productive" phase.

The process for preparing a rubber composition in accordance with the invention preferably comprises the following stages:

at least one elastomer, at least one reinforcing inorganic filler and at least one agent for coupling the elastomer to the reinforcing inorganic filler are brought into contact; said reinforcing inorganic filler comprising at least one silica S having:

a CTAB specific surface area $S_{CTAB}$ within a range extending from 40 to 300 m$^2$/g;

a difference between the BET specific surface area $S_{BET}$ and the CTAB specific surface area $S_{CTAB}$ of greater than or equal to 35 m²/g;

an aluminium content $W_{Al}$ within a range extending from 0.5 to 7.0% by weight relative to the weight of the silica;

a width of the aggregate size distribution Ld, measured by centrifugal sedimentation, of greater than or equal to 1.5; and a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A=[d50]+0.782\times[S_{CTAB}]-8.524\times[W_{Al}] \qquad (I)$$

in which:

[d50] is the numerical value of d50, expressed in nm;

[$S_{CTAB}$] is the numerical value of $S_{CTAB}$, expressed in m²/g;

[$W_{Al}$] is the numerical value of $W_{Al}$, expressed in % by weight relative to the weight of the silica S; and said magnitude A satisfies the relationship (II):

$$A \geq 253 \qquad (II)$$

everything is kneaded thermomechanically, once or several times, until a maximum temperature of between 110° C. and 190° C. is reached;

the mixture from the preceding step is cooled to a temperature below 100° C., a crosslinking system is incorporated into the cooled mixture from the preceding step, the mixture comprising the crosslinking system is kneaded up to a maximum temperature below 110° C.

The final composition thus obtained is subsequently calendered, for example in the form of a sheet or slab, especially for laboratory characterization, or else extruded, in order to form, for example, a rubber profiled element used in the manufacture of semi-finished products especially for tyres. These products may then be used for the manufacture of tyres, according to techniques known to those skilled in the art, with the advantage of the invention, namely a good rolling resistance/wear resistance compromise.

Preferably, the process for preparing a rubber composition in accordance with the invention also comprises a step in which the kneaded mixture comprising the crosslinking system is cured.

This curing (or vulcanization) step is carried out according to methods well known to those skilled in the art. It is especially carried out in a known way at a temperature generally of between 130° C. and 200° C., under a pressure of several hundred bar, for a sufficient time which may be within a range extending, for example, between 5 and 90 min, depending especially on the curing temperature, on the crosslinking system adopted, on the kinetics of vulcanization of the composition in question or else on the size of the tyre.

Semi-Finished Articles and Tyres

Another subject of the present invention relates to a semi-finished article, especially for a tyre, comprising at least one composition in accordance with the invention and as defined above. The semi-finished articles of the present invention advantageously have an improved rolling resistance/abrasion resistance compromise. The rubber composition of the semi-finished product may either be in the uncured state (before crosslinking) or in the cured state (after crosslinking).

The semi-finished article may be any article of use for the manufacture of finished rubber articles and for example a tyre.

Preferentially, the semi-finished article for a tyre may be selected from underlayers, bonding rubbers between rubbers of different natures or calendering rubbers for metal or textile reinforcers, sidewall rubbers or treads. More preferentially, the semi-finished article is a tyre tread.

The semi-finished articles are obtained by methods well known to those skilled in the art. The preferred modes of the silicas S, the elastomers and the coupling agents mentioned for the compositions in accordance with the invention also apply to this semi-finished article.

Another subject of the present invention relates to a tyre comprising at least one rubber composition in accordance with the invention and as described above or comprising at least one semi-finished article as described above. The tyres of the present invention advantageously have an improved rolling resistance/abrasion resistance compromise.

The tyres of the invention may especially be intended to equip motor vehicles of the passenger vehicle, SUV ("Sports Utility Vehicles"), two-wheel vehicle (especially motorcycle) or aircraft type, and industrial vehicles chosen from vans, heavy-duty vehicles, that is to say, underground trains, buses, heavy road transport vehicles (lorries, tractors, trailers) or off-road vehicles, such as heavy agricultural or construction plant vehicles, and other transportation or handling vehicles.

The tyres of the invention are obtained by methods well known to those skilled in the art. The preferred modes of the silicas S, the elastomers and the coupling agents mentioned for the compositions in accordance with the invention also apply to this tyre.

II—EXAMPLES

The examples which follow illustrate the invention without, however, limiting it.

II.1 Preparation of the Reinforcing Inorganic Fillers

The silicas used in the compositions to be tested are as follows:

Silica SC1

The silica SC1 is a silica sold by Solvay under the reference Zeosil® 1165MP. It is especially obtained according to the process described in application EP0520862-A1. Its characteristics are presented in table VI.

Silica SC2

The silica SC2 is a silica sold by Solvay under the reference Zeosil® Premium 200MP. It is especially obtained according to the process described in application WO03/016215-A1, pages 1 to 15. Its characteristics are presented in table VI.

Silica SC3

The silica SC3 was obtained in accordance with the protocol described on page 18, lines 15 to 32 of application WO03/106339-A1 (example 2). Its characteristics are presented in table VI.

Silica S1

16.7 l of purified water and 210 g of $Na_2SO_4$ (solid) are introduced into a 25 l stainless steel reactor. The solution obtained in this way is stirred and heated to reach a temperature of 92° C. The whole process is carried out at this temperature, with stirring, in order to maintain a homogeneous reaction medium. Sulfuric acid at a concentration of 7.7% by weight is introduced so as to reach a pH equal to 3.90.

A solution of sodium silicate (with an $SiO_2/Na_2O$ weight ratio=3.45 and an $SiO_2$ concentration=19.4% by weight) is introduced into the reactor at a flow rate of 115 g/min over 45 seconds. The same sodium silicate solution is used throughout the whole process. Next, a sodium silicate solution at a flow rate of 115 g/min and a sulfuric acid solution with a concentration equal to 7.7% by weight, at a flow rate of 140 g/min, are introduced simultaneously into the reactor over 14 min. The flow rate of the sulfuric acid solution is regulated so as to maintain the pH of the reaction medium equal to 4.50. At the end of this step, a sodium silicate solution at a flow rate of 115 g/min and a sulfuric acid solution at 96% by weight (referred to in the remainder of the description as 96% sulfuric acid) are introduced simultaneously over a period of 10 min. The flow rate of this 96% sulfuric acid solution is regulated so as to maintain a pH equal to 4.50.

The introduction of the 96% sulfuric acid is stopped while the addition of said sodium silicate solution is continued with a flow rate of 93 g/min until the reaction medium reaches a pH of 8.00.

A sodium silicate solution at a flow rate of 181 g/min and a 96% sulfuric acid solution are then introduced simultaneously into the reaction medium over a period of 3 min. The flow rate of the 96% sulfuric acid solution is regulated such that the pH of the reaction medium is maintained at a value of 8.00.

Then, the following are added simultaneously and over 15 min: a sodium silicate solution at a flow rate of 181 g/min, a sodium aluminate solution (% by weight of Al: 11.6%-% by weight of $Na_2O$: 19.9%) at a flow rate of 10 g/min and a 96% sulfuric acid solution. The flow rate of the 96% sulfuric acid solution is regulated such that the pH of the reaction medium is maintained at a value of 8.00.

At the end of this simultaneous addition, the reaction medium is brought to a pH=4.80 with 96% sulfuric acid. The reaction mixture is matured for 5 minutes. A suspension of precipitated silica is thus obtained.

The reaction medium is filtered and washed on a filter press. The cake obtained is mechanically crumbled. The resulting suspension is dried by means of atomization to obtain the precipitated silica S1. The characteristics of the precipitated silica S1 are indicated in table VI.

Silica S2

1129 l of water and 29.7 kg of $Na_2SO_4$ (solid) are introduced into a 2500 l stainless steel reactor. The solution obtained in this way is stirred and heated to reach a temperature of 92° C. The whole process is carried out at this temperature, with stirring, in order to maintain a homogeneous reaction medium. Sulfuric acid at 96% by weight (referred to in the remainder of the description as 96% sulfuric acid) is introduced into the reactor so as to reach a pH equal to 3.90. A solution of sodium silicate (with an $SiO_2/Na_2O$ weight ratio=3.46 and an $SiO_2$ concentration=19.4% by weight) is introduced into the reactor at a flow rate of 353 l/h over 61 seconds. The same sodium silicate solution is used throughout the whole process.

Next, a sodium silicate solution at a flow rate of 445 l/h, water at a flow rate of 575 l/h and a 96% sulfuric acid solution are introduced simultaneously into the reactor over 15 min. The flow rate of the 96% sulfuric acid solution is regulated so as to maintain the pH of the reaction medium equal to 3.90. At the end of this step, a sodium silicate solution at a flow rate of 445 l/h and a 96% sulfuric acid solution are introduced simultaneously over a period of 9 min. The flow rate of this 96% sulfuric acid solution is regulated so as to maintain a pH equal to 3.90. The introduction of the 96% sulfuric acid is stopped while the addition of said sodium silicate solution is continued with a flow rate of 582 l/h until the reaction medium reaches a pH of 8.00.

A sodium silicate solution at a flow rate of 703 l/h and a 96% sulfuric acid solution are then introduced simultaneously into the reaction medium over a period of 3 min. The flow rate of the 96% sulfuric acid solution is regulated such that the pH of the reaction medium is maintained at a value of 8.00.

Then, the following are added simultaneously and over 15 min: a sodium silicate solution at a flow rate of 703 l/h, a sodium aluminate solution (% by weight of Al: 11.6%-% by weight of $Na_2O$: 19.4%) at a flow rate of 47.6 kg/h and a 96% sulfuric acid solution. The flow rate of the 96% sulfuric acid solution is regulated such that the pH of the reaction medium is maintained at a value of 8.00.

At the end of this simultaneous addition, the reaction medium is brought to a pH=4.50 with 96% sulfuric acid. Water is then introduced to decrease the temperature to a value of 85° C. and the reaction mixture is matured for 5 minutes. A suspension of precipitated silica is thus obtained.

The reaction medium is filtered and washed on a filter press. The cake obtained is mechanically crumbled. The resulting suspension is dried by means of atomization to obtain the precipitated silica S2. The characteristics of the precipitated silica S2 are indicated in table VI.

Silica S3

16.7 l of purified water and 260 g of $Na_2SO_4$ (solid) are introduced into a 25 l stainless steel reactor. The solution obtained in this way is stirred and heated to reach a temperature of 92° C. The whole process is carried out at this temperature, with stirring, in order to maintain a homogeneous reaction medium. Sulfuric acid at a concentration of 7.7% by weight is introduced so as to reach a pH equal to 3.90. A solution of sodium silicate (with an $SiO_2/Na_2O$ weight ratio=3.4 and an $SiO_2$ concentration=19.4% by weight) is introduced into the reactor at a flow rate of 114 g/min over 45 seconds. The same sodium silicate solution is used throughout the whole process.

Next, a sodium silicate solution at a flow rate of 114 g/min and a sulfuric acid solution with a concentration equal to 7.7% by weight, at a flow rate of 137 g/min, are introduced simultaneously into the reactor over 14 min. The flow rate of the sulfuric acid solution is regulated so as to maintain the pH of the reaction medium equal to 4.53. At the end of this step, a sodium silicate solution at a flow rate of 114 g/min and a sulfuric acid solution at 96% by weight (referred to in the remainder of the description as 96% sulfuric acid) are introduced simultaneously over a period of 10 min. The flow rate of this 96% sulfuric acid solution is regulated so as to maintain a pH equal to 4.53.

The introduction of the 96% sulfuric acid is stopped while the addition of said sodium silicate solution is continued with a flow rate of 114 g/min until the reaction medium reaches a pH of 8.00.

A sodium silicate solution at a flow rate of 181 g/min and a 96% sulfuric acid are then introduced simultaneously into the reaction medium over a period of 3 min. The flow rate of the 96% sulfuric acid solution is regulated such that the pH of the reaction medium is maintained at a value of 8.00.

Then, the following are added simultaneously and over 15 min: a sodium silicate solution at a flow rate of 181 g/min, a sodium aluminate solution (% by weight of Al: 11.6%-% by weight of Na$_2$O: 19.9%) at a flow rate of 10 g/min and a 96% sulfuric acid solution. The flow rate of the 96% sulfuric acid solution is regulated such that the pH of the reaction medium is maintained at a value of 8.00.

At the end of this simultaneous addition, the reaction medium is brought to a pH=4.80 with 96% sulfuric acid. The reaction mixture is matured for 5 minutes. A suspension of precipitated silica is thus obtained.

The reaction medium is filtered and washed on a filter press. The cake obtained is mechanically crumbled. The resulting suspension is dried by means of atomization to obtain the precipitated silica S3. The characteristics of the precipitated silica S3 are indicated in table VI.

Silica S4

16.7 l of purified water and 260 g of Na$_2$SO$_4$ (solid) are introduced into a 25 l stainless steel reactor. The solution obtained in this way is stirred and heated to reach a temperature of 92° C. The whole process is carried out at this temperature, with stirring, in order to maintain a homogeneous reaction medium. Sulfuric acid at a concentration of 7.7% by weight is introduced so as to reach a pH equal to 3.90. A solution of sodium silicate (with an SiO$_2$/Na$_2$O weight ratio=3.4 and an SiO$_2$ concentration=19.3% by weight) is introduced into the reactor at a flow rate of 114 g/min over 45 seconds. The same sodium silicate solution is used throughout the whole process. Next, a sodium silicate solution at a flow rate of 114 g/min and a sulfuric acid solution with a concentration equal to 7.7% by weight, at a flow rate of 142 g/min, are introduced simultaneously into the reactor over 14 min. The flow rate of the sulfuric acid solution is regulated so as to maintain the pH of the reaction medium equal to 3.74. At the end of this step, a sodium silicate solution at a flow rate of 115 g/min and a sulfuric acid solution at 96% by weight (referred to in the remainder of the description as 96% sulfuric acid) are introduced simultaneously over a period of 10 min. The flow rate of this 96% sulfuric acid solution is regulated so as to maintain a pH equal to 3.74.

The introduction of the 96% sulfuric acid is stopped while the addition of said sodium silicate solution is continued with a flow rate of 114 g/min until the reaction medium reaches a pH of 8.00.

A sodium silicate solution at a flow rate of 182 g/min and a 96% sulfuric acid solution are then introduced simultaneously into the reaction medium over a period of 3 min. The flow rate of the 96% sulfuric acid solution is regulated such that the pH of the reaction medium is maintained at a value of 8.00.

Then, the following are added simultaneously and over 15 min: a sodium silicate solution at a flow rate of 182 g/min, a sodium aluminate solution (% by weight of Al: 11.6%-% by weight of Na$_2$O: 19.9%) at a flow rate of 10 g/min and a 96% sulfuric acid solution. The flow rate of the 96% sulfuric acid solution is regulated such that the pH of the reaction medium is maintained at a value of 8.00.

At the end of this simultaneous addition, the reaction medium is brought to a pH=4.80 with 96% sulfuric acid. The reaction mixture is matured for 5 minutes. A suspension of precipitated silica is thus obtained.

The reaction medium is filtered and washed on a filter press. The cake obtained is mechanically crumbled. The resulting suspension is dried by means of atomization to obtain the precipitated silica S4. The characteristics of the precipitated silica S4 are indicated in table VI.

TABLE VI

| Characteristics of the silicas used | | | | | | | |
|---|---|---|---|---|---|---|---|
| | SC1 | SC2 | SC3 | S1 | S2 | S3 | S4 |
| CTAB specific surface area ($S_{CTAB}$) in m$^2$/g | 155 | 200 | 147 | 152 | 202 | 135 | 228 |
| BET specific surface area ($S_{BET}$) in m$^2$/g | 160 | 220 | 255 | 234 | 263 | 207 | 296 |
| ($S_{BET}$ - $S_{CTAB}$) difference in m$^2$/g | 5 | 20 | 108 | 82 | 61 | 72 | 68 |
| Aluminium content ($W_{Al}$) in % by weight relative to the weight of SiO$_2$ | 0.3 | 0.3 | 1.4 | 1.4 | 1.3 | 1.4 | 1.4 |
| Width of the aggregate size distribution (Ld) | 1.3 | 1.4 | 1.9 | 1.9 | 1.9 | 1.8 | 1.9 |
| Median aggregate diameter (d50) in nm | 91 | 92 | 135 | 151 | 123 | 166 | 103 |
| A | 210 | 246 | 238 | 258 | 270 | 260 | 269 |

II.2 Preparation of the Rubber Compositions to be Tested

The rubber compositions to be tested are prepared in the following way: the diene elastomer (or the mixture of diene elastomers, where appropriate), then the reinforcing inorganic filler (silica to be tested), the agent for coupling the elastomer to the reinforcing inorganic filler, and then, after kneading for one to two minutes, the various other ingredients, with the exception of the sulfur and the sulfenamide primary accelerator, are introduced into an internal mixer which is 70% filled and which has an initial vessel temperature of approximately 60° C. Thermomechanical working is then carried out (non-productive phase) in one or two steps (total duration of the kneading equal to approximately 5 to 7 min, those skilled in the art know how to adapt this total duration as a function of the elastomer matrix of the composition), until a maximum "dropping" temperature of approximately 160-165° C. is reached. The mixture thus obtained is recovered and cooled and then the sulfur and sulfenamide accelerator are added on an external mixer (homofinisher) at 30° C., everything being mixed (productive phase) for 3 to 4 minutes.

The compositions are then formed for the measurements of their physical or mechanical properties (for example in the form of 4 mm test specimens, etc.) and where appropriate are cured (or vulcanized) for the measurements of the cured properties.

II.3 Test A

The aim of this test is to demonstrate the improved performance properties of a rubber composition in accordance with the invention, based on a novel silica, compared to a rubber composition conventionally used and sold in "green tyres".

For this purpose, four rubber compositions, especially intended for the manufacture of tyre treads, are compared:
the control compositions T1 and T2 contain the silica SC1,
the compositions in accordance with the invention C1 and C2 contain the silica S1.

The control compositions T1 and T2 are representative of rubber compositions used in commercial "green tyres", which are known to have a good compromise of rolling resistance/wear resistance performance properties.

The control composition T2 and the composition in accordance with the invention C2 differ respectively from the control composition T1 and the composition in accordance with the invention C1 by the nature of the elastomer and by the content of filler. The elastomer matrix of the compositions T1 and C1 comprises a functionalized diene elastomer and that of the compositions T2 and C2 comprises a non-functionalized diene elastomer.

Table VII gives the formulation of the different compositions, the contents being expressed as phr (parts by weight per hundred parts by weight of elastomers).

The optimal content of diphenylguanidine (DPG) is adapted depending on the BET specific surface area of the silica to be tested.

Indeed, the greater the BET specific surface area of a silica, the more it is necessary to use a high content of DPG in order to cover the surface of the silica and promote the dispersion thereof. Those skilled in the art know how to adapt these contents depending on the nature of the silica used. The formulations may be compared.

Each composition T1 and C1 has a density (ρ) equal to 1.23.

Each composition T2 and C2 has a density (ρ) equal to 1.18.

TABLE VII

| Composition | T1 | C1 | T2 | C2 |
| --- | --- | --- | --- | --- |
| Elastomer (1) | 100 | 100 | (—) | (—) |
| Elastomer (2) | (—) | (—) | 100 | 100 |
| Carbon black (3) | 3 | 3 | 3 | 3 |
| Silica SC1 | 130 | (—) | 100 | (—) |
| Silica S1 | (—) | 130 | (—) | 100 |
| Agent for coupling the elastomer to the reinforcing inorganic filler (4) | 10 | 10 | 8 | 8 |
| DPG (5) | 2.0 | 2.9 | 1.8 | 2.6 |
| Resin (6) | 47 | 47 | 47 | 47 |
| Plasticizer (7) | 23 | 23 | 23 | 23 |
| Anti ozone wax | 2 | 2 | 2 | 2 |
| Antioxidant (8) | 3 | 3 | 3 | 3 |
| Stearic acid | 3 | 3 | 3 | 3 |
| Zinc oxide | 1 | 1 | 1 | 1 |
| Accelerator (9) | 2 | 2 | 2 | 2 |
| Sulfur | 1 | 1 | 1 | 1 |

(1) Elastomer: Styrene/butadiene copolymer SBR, having a tertiary amine-alkoxysilane function in the middle of the chain and having a glass transition temperature, measured according to standard D3418 of 1999, equal to −48° C. Its microstructure, determined by the NIR method, is as follows: the content by weight of 1,4-trans units is 45.1%, that of 1,4-cis units is 30.5% and that of 1,2- units is 24.4% (each of these three contents relates to the butadiene units). The content by weight of styrene units is 27%;
(2) Elastomer: Non-functionalized styrene/butadiene copolymer SBR in solution, having a glass transition temperature measured according to standard D3418 of 1999 equal to −48° C. Its microstructure, determined by the NIR method, is as follows: the content by weight of 1,4-trans units is 50%, that of 1,4-cis units is 26% and that of 1,2- units is 24% (each of these three contents relates to the butadiene units). The content by weight of styrene units is 26.5%;
(3) N234 grade carbon black sold by Cabot Corporation;
(4) Coupling agent: Bis[3-(triethoxysilyl)propyl] tetrasulfide silane (TESPT) sold by Evonik under the reference Si69;
(5) DPG: diphenylguanidine, sold by Flexsys under the reference Perkacit;
(6) Resin: C5/C9 fraction sold by Exxon under the reference ECR-373;
(7) Plasticizer: Sunflower oil comprising 85% by weight of oleic acid, sold by Novance under the reference Lubrirob Tod 1880;
(8) Antioxidant: N-(1,3-dimethylbutyl)-N-phenyl-para-phenylenediamine sold by Flexsys under the reference Santoflex 6-PPD;
(9) Accelerator: N-cyclohexyl-2-benzothiazolesulfenamide sold by Flexsys under the reference Santocure CBS.

The properties measured after curing at 150° C. for 45 min are reported in table VIII.

TABLE VIII

| Composition | T1 | C1 | T2 | C2 |
| --- | --- | --- | --- | --- |
| Tan(δ)$_{max}$ at 23° C. | 100 | 61 | 100 | 74 |
| Abrasion | 100 | 77 | 100 | 85 |

Entirely surprisingly, the composition in accordance with the invention C1 simultaneously exhibits significantly decreased hysteresis and abrasion properties compared to the control composition T1.

This clear improvement in the hysteresis and abrasion properties is also observed in another elastomer matrix. Indeed, the composition C2 in accordance with the invention also exhibits much lower hysteresis and abrasion properties than the control composition T2.

In conclusion, these results show that the novel silica used in the compositions in accordance with the invention makes it possible to obtain rubber compositions having a clear improvement in the compromise of rolling resistance/wear resistance performance properties compared to the silica used in rubber compositions for "green tyres".

II.4 Test B

The aim of this test is to demonstrate the improved performance properties of a rubber composition in accordance with the invention, based on a novel silica, compared to a rubber composition comprising a silica of the prior art, WO03/016215-A1.

For this purpose, four rubber compositions, especially intended for the manufacture of tyre treads, are compared:
the control compositions T3 and T4 contain the silica SC2,
the compositions in accordance with the invention C3 and C4 contain the silica S2.

The control composition T4 and the composition in accordance with the invention C4 differ respectively from the control composition T3 and the composition in accordance with the invention C3 by the nature of the elastomer and by the content of filler. The elastomer matrix of the compositions T3 and C3 comprises a functionalized diene elastomer and that of the compositions T4 and C4 comprises a non-functionalized diene elastomer.

Table IX gives the formulation of the different compositions, the contents being expressed as phr (parts by weight per hundred parts by weight of elastomers).

The optimal content of diphenylguanidine (DPG) is adapted depending on the BET specific surface area of the silica to be tested.

Indeed, the greater the BET specific surface area of a silica, the more it is necessary to use a high content of DPG in order to cover the surface of the silica and promote the dispersion thereof. Those skilled in the art know how to adapt these contents depending on the nature of the silica used. The formulations may be compared.

Each composition T3 and C3 has a density (ρ) equal to 1.23.

Each composition T4 and C4 has a density (ρ) equal to 1.18.

TABLE IX

| Composition | T3 | C3 | T4 | C4 |
|---|---|---|---|---|
| Elastomer (1) | 100 | 100 | (—) | (—) |
| Elastomer (2) | (—) | (—) | 100 | 100 |
| Carbon black (3) | 3 | 3 | 3 | 3 |
| Silica SC2 | 130 | (—) | 100 | (—) |
| Silica S2 | (—) | 130 | (—) | 100 |
| Agent for coupling elastomer/reinforcing inorganic filler (4) | 13 | 13 | 10.4 | 10.4 |
| DPG (5) | 2.8 | 3.3 | 2.5 | 3.0 |
| Resin (6) | 47 | 47 | 47 | 47 |
| Plasticizer (7) | 23 | 23 | 23 | 23 |
| Anti ozone wax | 2 | 2 | 2 | 2 |
| Antioxidant (8) | 3 | 3 | 3 | 3 |
| Stearic acid | 3 | 3 | 3 | 3 |
| Zinc oxide | 1 | 1 | 1 | 1 |
| Accelerator (9) | 2 | 2 | 2 | 2 |
| Sulfur | 1 | 1 | 1 | 1 |

(1) Elastomer: Styrene/butadiene copolymer SBR, having an amine-alkoxysilane function in the middle of the chain and having a glass transition temperature, measured according to standard D3418 of 1999, equal to −48° C. Its microstructure, determined by the NIR method, is as follows: the content by weight of 1,4-trans units is 45.1%, that of 1,4-cis units is 30.5% and that of 1,2- units is 24.4% (each of these three contents relates to the butadiene units). The content by weight of styrene units is 27%;
(2) Elastomer: Non-functionalized styrene/butadiene copolymer SBR in solution, having a glass transition temperature measured according to standard D3418 of 1999 equal to −48° C. Its microstructure, determined by the NIR method, is as follows: the content by weight of 1,4-trans units is 50%, that of 1,4-cis units is 26% and that of 1,2- units is 24% (each of these three contents relates to the butadiene units). The content of styrene units is 26.5%;
(3) N234 grade carbon black sold by Cabot Corporation;
(4) Coupling agent: Bis[3-(triethoxysilyl)propyl] tetrasulfide silane (TESPT) sold by Evonik under the reference Si69;
(5) DPG: diphenylguanidine, sold by Flexsys under the reference Perkacit;
(6) Resin: C5/C9 fraction sold by Exxon under the reference ECR-373;
(7) Plasticizer: Sunflower oil comprising 85% by weight of oleic acid, sold by Novance under the reference Lubrirob Tod 1880;
(8) Antioxidant: N-(1,3-dimethylbutyl)-N-phenyl-para-phenylenediamine sold by Flexsys under the reference Santoflex 6-PPD;
(9) Accelerator: N-cyclohexyl-2-benzothiazolesulfenamide sold by Flexsys under the reference Santocure CBS.

The properties measured after curing at 150° C. for 45 min are reported in table X.

TABLE X

| Composition | T3 | C3 | T4 | C4 |
|---|---|---|---|---|
| Tan(δ)$_{max}$ at 23° C. | 100 | 83 | 100 | 85 |
| Abrasion | 100 | 85 | 100 | 90 |

Entirely surprisingly, the composition in accordance with the invention C3 simultaneously exhibits significantly decreased hysteresis and abrasion properties compared to the control composition T3.

This clear improvement in the hysteresis and abrasion properties is also observed in another elastomer matrix. Indeed, the composition C4 in accordance with the invention also exhibits much lower hysteresis and abrasion properties than the control composition T4.

In conclusion, these results show that the novel silica used in the compositions in accordance with the invention makes it possible to obtain rubber compositions having a clear improvement in the compromise of rolling resistance/wear resistance performance properties compared to the silica used in rubber compositions of the prior art.

II.5 Test C

The aim of this test is to demonstrate the improved performance properties of a rubber composition in accordance with the invention, based on a novel silica, compared to a rubber composition comprising a silica of the prior art, WO03/106339-A1.

For this purpose, two rubber compositions, intended for the manufacture of tyre treads, are compared:
the control composition T5 contains the silica SC3,
the composition in accordance with the invention C5 contains the silica S1.

Table XI gives the formulation of the different compositions, the contents being expressed as phr (parts by weight per hundred parts by weight of elastomers).

The content of agent for coupling the elastomer to the reinforcing inorganic filler and the content of diphenylguanidine (DPG) are adapted respectively to the CTAB and BET specific surface area of the silica to be tested. Indeed, the greater the specific surface area $S_{CTAB}$ of a silica, the larger the number of potential binding sites between the reinforcing inorganic filler and the elastomer, and hence the greater the amount of said coupling agent required to promote bonds between the reinforcing inorganic filler and the elastomer. Moreover, the greater the BET specific surface area of a silica, the more it is necessary to use a high content of DPG in order to cover the surface of the silica and promote the dispersion thereof. Those skilled in the art know how to adapt these contents depending on the nature of the silica used. The formulations may be compared.

Each composition T5, C5 has a density (ρ) equal to 1.23.

TABLE XI

| Composition | T5 | C5 |
|---|---|---|
| Elastomer (1) | 100 | 100 |
| Carbon black (2) | 3 | 3 |
| Silica SC3 | 130 | (—) |
| Silica S1 | (—) | 130 |
| Agent for coupling elastomer/reinforcing inorganic filler (3) | 9.5 | 9.8 |
| DPG (4) | 3.4 | 2.9 |
| Resin (5) | 47 | 47 |
| Plasticizer (6) | 23 | 23 |
| Anti ozone wax | 2 | 2 |
| Antioxidant (7) | 3 | 3 |
| Stearic acid | 3 | 3 |
| Zinc oxide | 1 | 1 |
| Accelerator (8) | 2 | 2 |
| Sulfur | 1 | 1 |

(1) Elastomer: Styrene/butadiene copolymer SBR, having an amine-alkoxysilane function in the middle of the chain and having a glass transition temperature, measured according to standard D3418 of 1999, equal to −48° C. Its microstructure, determined by the NIR method, is as follows: the content by weight of 1,4-trans units is 45.1%, that of 1,4-cis units is 30.5% and that of 1,2- units is 24.4% (each of these three contents relates to the butadiene units). The content by weight of styrene units is 27%;
(2) N234 grade carbon black sold by Cabot Corporation;
(3) Coupling agent: Bis[3-(triethoxysilyl)propyl] tetrasulfide silane (TESPT) sold by Evonik under the reference Si69;
(4) DPG: diphenylguanidine, sold by Flexsys under the reference Perkacit;
(5) Resin: C5/C9 fraction sold by Exxon under the reference ECR-373;
(6) Plasticizer: Sunflower oil comprising 85% by weight of oleic acid, sold by Novance under the reference Lubrirob Tod 1880;
(7) Antioxidant: N-(1,3-dimethylbutyl)-N-phenyl-para-phenylenediamine sold by Flexsys under the reference Santoflex 6-PPD;
(8) Accelerator: N-cyclohexyl-2-benzothiazolesulfenamide sold by Flexsys under the reference Santocure CBS.

The properties measured after curing at 150° C. for 45 min are reported in table XII.

TABLE XII

| Composition | T5 | C5 |
|---|---|---|
| Tan(δ)$_{max}$ at 23° C. | 100 | 86 |
| Abrasion | 100 | 92 |

Entirely surprisingly, the composition in accordance with the invention C5 simultaneously exhibits significantly decreased hysteresis and abrasion properties compared to the control composition T5.

An improvement in the compromise of rolling resistance/wear resistance performance properties is therefore observed with the composition in accordance with the invention C5 comprising the novel silica S1 as reinforcing inorganic filler, compared to the control composition T5.

II.6 Test D

The aim of this test is to demonstrate the improved performance properties of rubber compositions in accordance with the invention, based on novel silicas, compared to a rubber composition conventionally used and sold in "green tyres".

For this purpose, four rubber compositions, intended for the manufacture of tyre treads, are compared:
the control composition T1 contains the silica SC1,
the compositions in accordance with the invention C6, C7 and C8 are different embodiments of the invention.

Table XIII gives the formulation of the different compositions, the contents being expressed as phr (parts by weight per hundred parts by weight of elastomers).

The content of agent for coupling the elastomer to the reinforcing inorganic filler and the content of diphenylguanidine (DPG) are adapted respectively to the CTAB and BET specific surface area of the silica to be tested. Indeed, the greater the specific surface area $S_{CTAB}$ of a silica, the larger the number of potential binding sites between the reinforcing inorganic filler and the elastomer, and hence the greater the amount of said coupling agent required to promote bonds between the reinforcing inorganic filler and the elastomer. Moreover, the greater the BET specific surface area of a silica, the more it is necessary to use a high content of DPG in order to cover the surface of the silica and promote the dispersion thereof. Those skilled in the art know how to adapt these contents depending on the nature of the silica used. The formulations may be compared.

Each composition T1, C6, C7 and C8 has a density (ρ) equal to 1.23.

TABLE XIII

| Composition | T1 | C6 | C7 | C8 |
|---|---|---|---|---|
| Elastomer (1) | 100 | 100 | 100 | 100 |
| Carbon black (3) | 3 | 3 | 3 | 3 |
| Silica SC1 | 130 | (—) | (—) | (—) |
| Silica S3 | (—) | 130 | (—) | (—) |
| Silica S2 | (—) | (—) | 130 | (—) |
| Silica S4 | (—) | (—) | (—) | 130 |
| Agent for coupling elastomer/reinforcing inorganic filler (4) | 10 | 8.7 | 13.0 | 14.7 |
| DPG (5) | 2.0 | 2.6 | 3.3 | 3.7 |
| Resin (6) | 47 | 47 | 47 | 47 |
| Plasticizer (7) | 23 | 23 | 23 | 23 |
| Anti ozone wax | 2 | 2 | 2 | 2 |
| Antioxidant (8) | 3 | 3 | 3 | 3 |
| Stearic acid | 3 | 3 | 3 | 3 |
| Zinc oxide | 1 | 1 | 1 | 1 |

TABLE XIII-continued

| Composition | T1 | C6 | C7 | C8 |
|---|---|---|---|---|
| Accelerator (9) | 2 | 2 | 2 | 2 |
| Sulfur | 1 | 1 | 1 | 1 |

(1) Elastomer: Styrene/butadiene copolymer SBR, having an amine-alkoxysilane function in the middle of the chain and having a glass transition temperature, measured according to standard D3418 of 1999, equal to −48° C. Its microstructure, determined by the NIR method, is as follows: the content by weight of 1,4-trans units is 45.1%, that of 1,4-cis units is 30.5% and that of 1,2- units is 24.4% (each of these three contents relates to the butadiene units). The content by weight of styrene units is 27%;
(3) N234 grade carbon black sold by Cabot Corporation;
(4) Coupling agent: Bis[3-(triethoxysilyl)propyl] tetrasulfide silane (TESPT) sold by Evonik under the reference Si69;
(5) DPG: diphenylguanidine, sold by Flexsys under the reference Perkacit;
(6) Resin: C5/C9 fraction sold by Exxon under the reference ECR-373;
(7) Plasticizer: Sunflower oil comprising 85% by weight of oleic acid, sold by Novance under the reference Lubrirob Tod 1880;
(8) Antioxidant: N-(1,3-dimethylbutyl)-N-phenyl-para-phenylenediamine sold by Flexsys under the reference Santoflex 6-PPD;
(9) Accelerator: N-cyclohexyl-2-benzothiazolesulfenamide sold by Flexsys under the reference Santocure CBS.

The properties measured after curing at 150° C. for 45 min are reported in table XIV.

TABLE XIV

| Composition | T1 | C6 | C7 | C8 |
|---|---|---|---|---|
| Tan(δ)$_{max}$ at 23° C. | 100 | 65 | 87 | 106 |
| Abrasion | 100 | 94 | 75 | 78 |

Compared to the control composition T1, the compositions of the invention C6, C7 and C8, which comprise novel silicas with different morphology, all exhibit decreased abrasion, synonymous with good wear resistance.

The compositions in accordance with the invention C6 and C7 also have very good hysteresis properties compared to the control composition T1.

The composition C8 has a slightly higher hysteresis than that of the control composition T1. Nonetheless, this slight deterioration remains acceptable for use in tyres and the gain in abrasion of this composition is significant.

The invention claimed is:

1. A rubber composition based on at least one elastomer, a reinforcing inorganic filler, an agent for coupling the elastomer to the reinforcing inorganic filler, and a crosslinking system, wherein the reinforcing inorganic filler comprises at least one silica S having:
a CTAB specific surface area $S_{CTAB}$ within a range extending from 40 to 300 m²/g;
a difference between a BET specific surface area $S_{BET}$ and the CTAB specific surface area $S_{CTAB}$ of greater than or equal to 35 m²/g;
an aluminium content $W_{Al}$ within a range extending from 0.5 to 7.0% by weight relative to a weight of the silica S;
a width of the aggregate size distribution Ld, measured by centrifugal sedimentation, of greater than or equal to 1.5; and
a median aggregate diameter d50, measured by centrifugal sedimentation, such that for a given value of CTAB specific surface area $S_{CTAB}$ and a given aluminium content $W_{Al}$, a magnitude A is defined by the following equation (I):

$$A = [d50] + 0.782 \times [S_{CTAB}] - 8.524 \times [W_{Al}] \qquad (I)$$

in which:
[d50] is the numerical value of d50, expressed in nm;
[$S_{CTAB}$] is the numerical value of $S_{CTAB}$, expressed in m²/g;

[W$_{Al}$] is the numerical value of W$_{Al}$, expressed in % by weight relative to the weight of the silica S; and the magnitude A satisfies the relationship (II):

$$A \geq 253 \qquad \text{(II), and}$$

wherein the content of reinforcing inorganic filler is within a range extending from 80 to 150 phr.

2. The rubber composition according to claim 1, wherein the relationship (II) is 259≤A≤300 (IIf).

3. The rubber composition according to claim 1, wherein the aluminium content W$_{Al}$ of the silica S is within a range extending from 0.5 to 5.0% by weight relative to the weight of the silica S.

4. The rubber composition according to claim 1, wherein the width of the aggregate size distribution Ld, measured by centrifugal sedimentation, of the silica S is within a range extending from 1.5 to 3.5.

5. The rubber composition according to claim 1, wherein the difference between the BET specific surface area S$_{BET}$ and the CTAB specific surface area S$_{CTAB}$ of the silica S is greater than or equal to 40 m$^2$/g.

6. The rubber composition according to claim 1, wherein the CTAB specific surface area S$_{CTAB}$ of the silica S is within a range extending from 110 to 300 m$^2$/g.

7. The rubber composition according to claim 1, wherein the silica S has a BET specific surface area S$_{BET}$ of greater than or equal to 160 m$^2$/g.

8. The rubber composition according to claim 1, wherein the reinforcing inorganic filler further comprises an additional silica other than the silica S.

9. The rubber composition according to claim 1, wherein the silica S represents at least 50% by weight of the total weight of the reinforcing inorganic filler.

10. The rubber composition according to claim 1, wherein the silica S represents 100% by weight of the total weight of the reinforcing inorganic filler.

11. The rubber composition according to claim 1 further comprising a reinforcing organic filler which is carbon black.

12. The rubber composition according to claim 1, wherein the elastomer is a diene elastomer.

13. The rubber composition according to claim 12, wherein the diene elastomer is selected from the group consisting of polybutadienes, natural rubber, synthetic polyisoprenes, butadiene copolymers, isoprene copolymers and mixtures thereof.

14. The rubber composition according to claim 12, wherein the diene elastomer is selected from the group consisting of polybutadienes, butadiene/styrene copolymers, isoprene/butadiene copolymers, isoprene/styrene copolymers, isoprene/butadiene/styrene copolymers and mixtures thereof.

15. The rubber composition according to claim 12, wherein the elastomer is a functionalized diene elastomer.

16. A semi-finished article comprising at least one composition according to claim 1.

17. The semi-finished article according to claim 16, wherein the semi-finished article is a tire tread.

18. A tire comprising at least one composition according to claim 1.

19. A process for preparing a rubber composition based on at least one elastomer, a reinforcing inorganic filler, an agent for coupling the elastomer to the reinforcing inorganic filler, and a crosslinking system, the process comprising the following steps:

contacting the at least one elastomer, the at least one reinforcing inorganic filler, and the at least one agent for coupling the elastomer to the reinforcing inorganic filler to make a mixture, wherein the content of reinforcing inorganic filler is within a range extending from 80 to 150 phr, wherein the reinforcing inorganic filler comprises at least one silica S having:

a CTAB specific surface area S$_{CTAB}$ within a range extending from 40 to 300 m$^2$/g;

a difference between a BET specific surface area S$_{BET}$ and the CTAB specific surface area S$_{CTAB}$ of greater than or equal to 35 m$^2$/g;

an aluminium content W$_{Al}$ within a range extending from 0.5 to 7.0% by weight relative to a weight of the silica S;

a width of the aggregate size distribution Ld, measured by centrifugal sedimentation, of greater than or equal to 1.5; and a median aggregate diameter d50, measured by centrifugal sedimentation, such that for a given value of CTAB specific surface area S$_{CTAB}$ and a given aluminium content W$_{Al}$, a magnitude A is defined by the following equation (I):

$$A=[d50]+0.782\times[S_{CTAB}]-8.524\times[W_{Al}] \qquad (I)$$

in which:

[d50] is the numerical value of d50, expressed in nm;

[S$_{CTAB}$] is the numerical value of S$_{CTAB}$, expressed in m$^2$/g;

[W$_{Al}$] is the numerical value of W$_{Al}$, expressed in % by weight relative to the weight of the silica S; and the magnitude A satisfies the relationship (II):

$$A \geq 253 \qquad \text{(II);}$$

thermomechanically kneading the mixture, once or several times, until a maximum temperature of between 110° C. and 190° C. is reached;

cooling the mixture from the preceding step to a temperature below 100° C.;

incorporating a crosslinking system into the cooled mixture from the preceding step; and kneading the mixture comprising the crosslinking system up to a maximum temperature below 110° C.

* * * * *